United States Patent [19]
Matsuda

[11] Patent Number: 4,969,101
[45] Date of Patent: Nov. 6, 1990

[54] METHOD AND SYSTEM FOR DERIVING VALUE REPRESENTATIVE OF VEHICLE SPEED FOR USE IN SLIP CONTROL FOR AUTOMOTIVE WHEELS

[75] Inventor: Toshiro Matsuda, Kanagawa, Japan

[73] Assignee: Nissan Motor Company, Limited, Yokohama, Japan

[21] Appl. No.: 394,152

[22] Filed: Aug. 15, 1989

[30] Foreign Application Priority Data

Dec. 23, 1985 [JP] Japan .................. 60-287674

[51] Int. Cl.$^5$ .............................................. B60T 8/84
[52] U.S. Cl. .............................. 364/426.02; 364/565; 303/96; 303/103
[58] Field of Search .......................... 364/426.02, 565; 180/197; 303/94–96, 102, 103, 109; 324/160, 161

[56] References Cited

U.S. PATENT DOCUMENTS

| | | | |
|---|---|---|---|
| 3,920,280 | 11/1975 | Luhdorff et al. | 303/96 |
| 4,164,872 | 8/1979 | Weigl | 180/197 |
| 4,420,191 | 12/1983 | Arikawa et al. | 364/426 |
| 4,439,832 | 3/1984 | Sato et al. | 364/426 |
| 4,576,419 | 3/1986 | Leiber | 303/96 |
| 4,652,060 | 3/1987 | Miyake | 303/96 |
| 4,668,022 | 5/1987 | Sato | 303/96 |
| 4,675,819 | 6/1987 | Fennel | 364/426 |

*Primary Examiner*—Gary Chin
*Attorney, Agent, or Firm*—Foley & Lardner, Schwartz, Jeffery, Schwaab, Mack, Blumenthal & Evans

[57] ABSTRACT

A derivation of a vehicle speed representing value includes detection of wheel slip caused at least one of vehicular wheels. The process further includes a step for deriving vehicle speed representing value with respect to each vehicular wheel and a step for selecting one of the vehicle speed representing values derived with respect to each vehicular wheel when wheel slip at least one of the wheels is detected. Selection of one of the vehicle speed representing values is performed by omitting the vehicle speed representing value derived with respect to one of the wheels on which wheel slip is caused. The selected one of the vehicle speed representing value is used as a common vehicle speed indicative parameter for performing wheel slip control, such as anti-skid brake control, traction control and so forth.

9 Claims, 15 Drawing Sheets

METHOD AND SYSTEM FOR DERIVING VALUE REPRESENTATIVE OF VEHICLE SPEED FOR USE IN SLIP CONTROL FOR AUTOMOTIVE WHEELS

This application is a continuation of application Ser. No. 06/945,565, filed Dec. 23, 1986 now abandoned.

BACKGROUND OF THE INVENTION

1. Field of the Invention

The present invention relates generally to a method and system for deriving a vehicle speed representing value which can be used in wheel slip control, such as an anti-skid control, a traction control and so forth. More specifically, the invention relates to a derivation of vehicle speed representing value which precisely corresponds to an actual vehicle speed for accuracy in wheel slip control. Further specifically, the invention relates to a derivation of a vehicle speed representing value based on a rotation speed of a vehicular wheel.

2. Description of the Prior Art

As is well known, wheel slip control, such as anti-skid brake control and traction control, which controls driving torque on vehicular wheels for eliminating wheel-spin, is performed generally based on a wheel slippage. The wheel slippage is generally derived on the basis of a difference between a wheel rotation speed and a vehicle speed. Namely, anti-skid brake control is carried out to maintain wheel slippage around 10 to 20% for optimizing vehicular braking characteristics. On the other hand, in the traction control a, wheel-spinning condition is detected by detecting wheel speed exceeding a vehicle speed representative value.

Therefore, in order to perform precise wheel slip control, it is essential to detect vehicle speed accurately. Substantially high accuracy of vehicle speed detection can be made by means of a known lader systems, such as a dopper lader system. However, such lader system are expensive facilitating for wheel slip control. Therefore, in practice, the vehicle speed representing value has to be derived based on other parameter which can be obtained an inexpensive sensor or sensors.

Conventionally, the vehicle speed representing values have been derived on the basis of rotation speeds of vehicular wheels. For example, the Japanese Patent Second (examined) Publication (Tokko) Showa 41-17082 discloses an anti-skid brake control system with derivation of the vehicle speed representing value. In the disclosed procedure, one of the wheels which is rotatating at the highest speed is selected to take the rotation speed thereof, thus deriving the vehicle speed representing value. However, during abrupt deceleration of the vehicle, even the wheel speed of the highest speed wheel will not represent the vehicle speed. Therefore, in the conventional system, the vehicle speed representing value may be arithmetically derived by latching a highest wheel speed upon initiation of one cycle of wheel slip control operation and decreasing a constant value at every given interval for deriving assumed vehicle speed representing values to be used during abrupt deceleration.

Difficulty in performing accurate or precise anti-skid brake control arises when one of the wheels effect wheel-spin to accidentally increase wheel speed beyond the value corresponding to the vehicle speed. In such a case, errorneous detection is made while no wheel is skidding to initial anti-skid control. This causes expansion of braking distance due to lesser braking pressure to be exerted on the wheel.

SUMMARY OF THE INVENTION

Therefore, it is an object of the invention to provide derivation of a vehicle speed representing value in precise manner.

Another object of the invention is to provide a method and system for deriving a vehicle speed representing value which can eliminate errors in the derivation of the vehicle speed representing value caused by slippage of wheel.

A further object of the invention is to provide a method and system for deriving a vehicle speed representing value applicable for a wheel slip control, such as anti-skid brake control, traction control and so forth.

In order to accomplish the aforementioned and other objects, a derivation of a vehicle speed representing value, according to the present invention, includes detection of wheel slip caused by at least one of vehicular wheels. The process further includes a step for deriving a vehicle speed representing value with respect to each vehicular wheel and a step for selecting one of the vehicle speed representing values derived with respect to each vehicular wheel when wheel slip by at least one of the wheels is detected. Selection of one of the vehicle speed representing values is performed by omitting the vehicle speed representing value derived with respect to one of the wheels on which the wheel slip occurs. The selected one of the vehicle speed representing value is used as a common vehicle speed indicative parameter for performing wheel slip control, such as anti-skid brake control, traction control and so forth.

In the practical wheel slip control, the common vehicle speed representing value is compared with each wheel speed representing values derived with respect to each of the wheels. Slip control operation will take place with respect to each wheel when the wheel speed of each wheel has a predetermined relationship with the common vehicle speed representing value.

According to one aspect of the invention, a system for deriving a value representative of a vehicle speed based on a wheel speed in a control system for controlling wheel speed of each wheel to be maintained in a predetermined relationship with a common vehicle speed representing value, comprises first means for monitoring rotation speed of a first wheel to produce a first wheel speed indicative signal, second means for monitoring rotation speed of a second wheel to produce a second wheel speed indicative signal, third means for latching the first wheel speed indicative signal value when rotating condition of the first wheel satisfies a predetermined condition and for deriving a first vehicle speed representing signal based on latched value, fourth means for latching the second wheel speed indicative signal value when rotating condition of the first wheel satisfies a predetermined condition and for deriving a second vehicle speed representing signal based on latched value, fifth means for detecting occurence of wheel slip at one of the first and second wheels for producing a wheel slip indicative signal, and sixth means for normally selecting one of, the first and second vehicle speed representing values greater than the other to output as the common vehicle speed representing value, and the sixth means being responsive to the wheel slip indicative signal to select the other of the first and second vehicle speed representing values.

The fifth means comprises means for detecting wheel acceleration higher than a predetermined wheel slip threshold and for producing the wheel slip indicative signal whenever the wheel acceleration is higher than the wheel slip threshold. The fifth means further comprises means responsive to decreasing of the wheel acceleration across the wheel slip threshold, for maintaining the wheel slip indicative signal for a given period of time.

In the alternative, the fifth means comprises means for comparing the first wheel speed indicative signal value with the first vehicle speed representing value to produce a first HIGH level signal when the first wheel speed indicative signal value is greater than the first vehicle speed representing value at a magnitude greater than a given value, means for comparing a second HIGH level signal value with the second vehicle speed representing value to produce the wheel slip indicative signal when the second wheel speed indicative signal value is greater than the second vehicle speed representing value at a magnitude greater than the given value and means responsive to one of the first and second HIGH level signals, for producing the wheel slip indicative signal. The fifth means further comprises means responsive to the trailing edge of one of the first and second HIGH level signals for maintaining the wheel slip indicative signal for a given period of time.

In the further alternative embodiment, the fifth means comprises means for comparing the first and second wheel speed indicative signal values with the common vehicle speed representing value to produce a wheel slip indicative signal when one of the first and second wheel speed indicative signal values is greater than the common vehicle speed representing value at a magnitude greater than a given value. The fifth means further comprises means responsive to the trailing edge of one of the first and second HIGH level signals for maintaining the wheel slip indicative signal for a given period of time.

According to another aspect of the invention a method for deriving a value representative of a vehicle speed based on a wheel speed in a control system for controlling wheel speed of each wheel to be maintained in a predetermined relationship with a common vehicle speed representing value, comprises the steps of:
monitoring rotation speed of a first wheel to produce a first wheel speed indicative signal;
monitoring rotation speed of a second wheel to produce a second wheel speed indicative signal;
latching the first wheel speed indicative signal value when rotating condition of the first wheel satisfies a predetermined condition and for deriving a first vehicle speed representing signal based on latched value;
latching the second wheel speed indicative signal value when rotating condition of the first wheel satisfies a predetermined condition and for deriving a second vehicle speed representing signal based on latched value;
detecting occurence of wheel slip at one of the first and second wheels for producing a wheel slip indicative signal; and
normally selecting one of the first and second vehicle speed representing value greater than the other to output as the common vehicle speed representing value, and selecting the other of the first and second vehicle speed representing value in response to the wheel speed indicative signal.

According to a further aspect of the invention, an anti-skid brake control system for an automotive brake system comprising:
a hydraulic brake circuit including a plurality of wheel cylinders for establishing braking pressure for decelerating vehicular wheels;
first and second anti-skid brake control valves, each associated at least one of first and second wheel cylinders associated with first and second wheels for adjusting braking pressure therein, each of the anti-skid brake control valves being operable, to increase braking pressure in the associated wheel cylinder in a first mode position, and to decrease the braking pressure in the associated wheel cylinder in a second mode position;
first sensor for monitoring rotation speed of the first wheel for producing a first wheel speed indicative signal;
second sensor for monitoring rotation speed of the second wheel for producing a second wheel speed indicative signal;
first arithmetic means for deriving wheel speed based on the first wheel speed indicative signal to produce a first wheel speed data;
second arithmetic means for deriving wheel speed based on the wheel speed indicative signal to produce a second wheel speed data;
third arithmetic means for deriving first wheel acceleration on the basis of the first wheel speed data to produce a first wheel acceleration data;
fourth arithmetic means for deriving second wheel acceleration on the basis of the second wheel speed data to produce a second wheel acceleration data;
fifth arithmetic means for deriving a common vehicle speed representing valve, which comprises:
means for latching the first wheel speed data when the wheel acceleration data decreases across a predetermined wheel deceleration threshold, and for deriving a first vehicle speed representing signal based on latched value;
means for latching the second wheel speed data when the second wheel acceleration data decreases across the predetermined wheel deceleration value, and for deriving a second vehicle speed representing signal based on latched value;
means for detecting occurence of wheel slip at one of the first and second wheels for producing a wheel slip indicative signal; and
means for normally selecting one of the first and second vehicle speed representing value greater than the other to output as the common vehicle speed representing value, and the sith means being responsive to the wheel slip indicative signal to select the other of the first and second vehicle speed representing value;
first controller for controlling the first anti-skid brake control valve between the first and second positions on the basis of the first wheel speed data and the first wheel acceleration data; and
second controller for controlling the second anti-skid brake control valve between the first and second positions on the basis of the second wheel speed data and the second wheel acceleration data.

DESCRIPTION OF THE PREFERRED EMBODIMENT

Figure 1A:
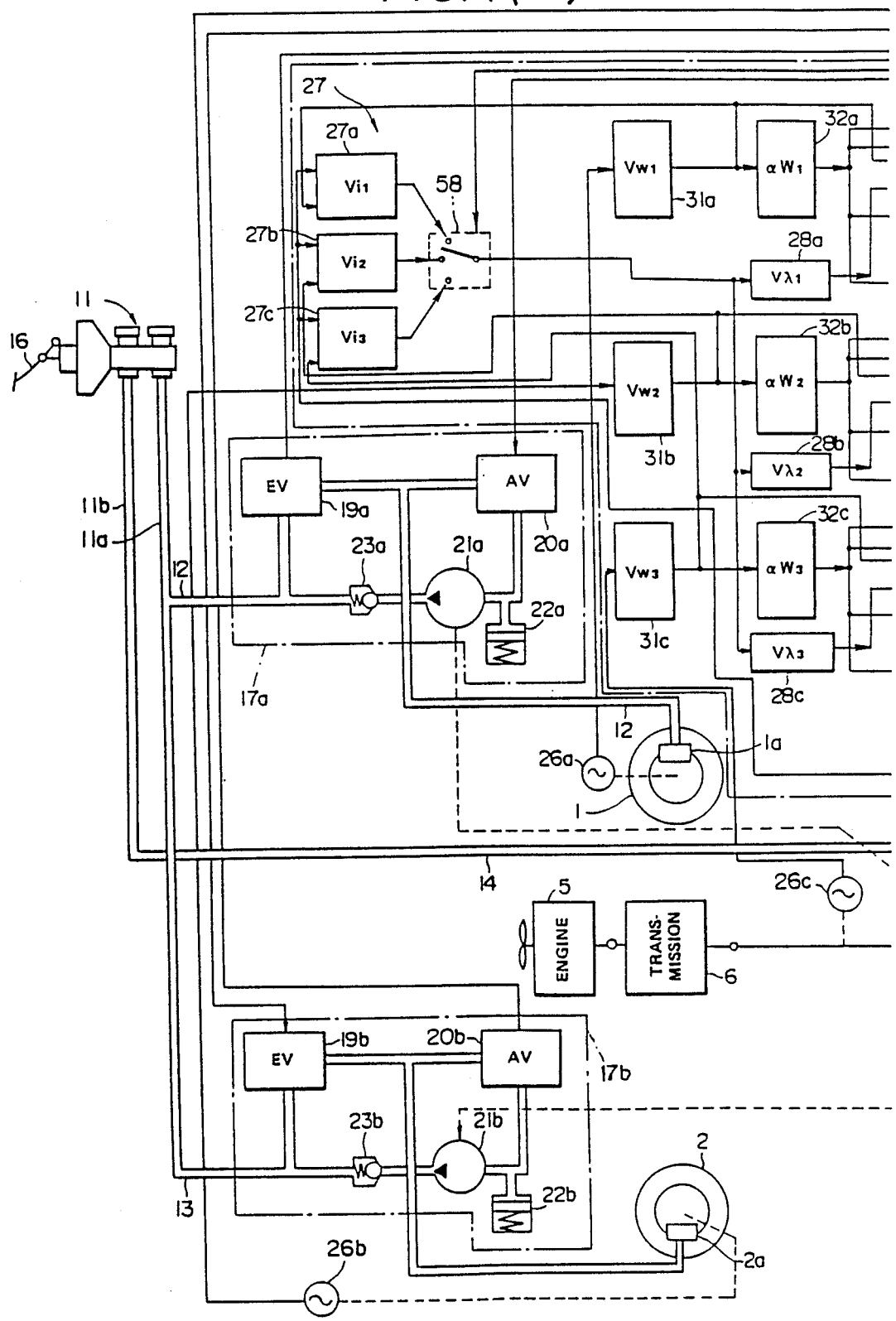
FIGS. 1(A) and 1(B) are block diagram of an overall wheel slip control system, to which the preferred embodiment of a vehicle speed representing value derivation system according to the invention, is applied.
Figure 1B:
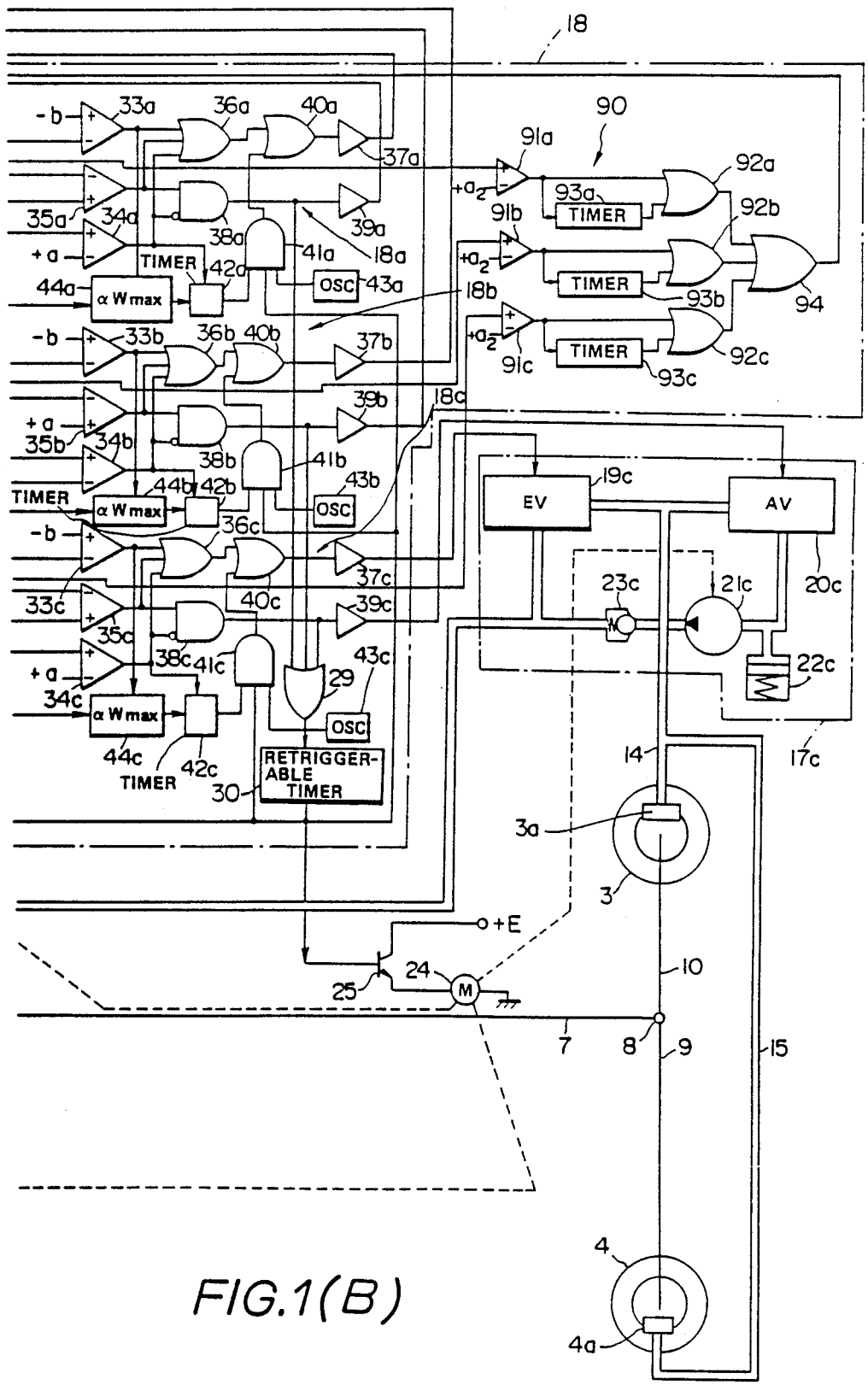

Referring now to the drawings, particularly to FIG. 1, a wheel slip control system is designed for controlling wheel slip at respective front and rear wheels 1, 2, 3 and 4. Each front and rear wheels 1, 2, 3 and 4 are co-operated with wheel cylinders 1a, 2a, 3a and 4a so as to apply braking force therethrough. On the other hand, the rear wheels 3 and 4 are connected to an automotive engine through a power train consituted by a transmission 6, a propeller shaft 7, a differential gear unit 8 and drive shafts 9 and 10.

In the shown embodiment, the wheel slip control system controls the braking force to be exerted to each of the wheel cylinders for performing anti-skid brake control for preventing the wheels from skidding. On the other hand, the wheel slip control system controls the engine output torque or driving torque distribution to the driven rear wheels 3 and 4 so as to prevent the wheels from causing wheel-spin and to provide better tyre/road traction. The engine output torque control or power distribution control may be performed by adjusting throttle valve angular position by means of a throttle valve servo systems, such as that disclosed in British Patent First Publications Nos. 2,154,763 and 2,154,765.

The disclosure of the above-identified British Patent First Publications are herein incorporated by reference for the sake of disclosure. Furthermore, traction control systems for adjusting driving torque to be exerted on the driven wheels of the vehicle have been disclosed in the co-pending U.S. patent application Ser. No. 903,474, filed on Sept. 4, 1986, assigned to the common assignee to the present invention. The disclosure of the above-identified co-pending U.S. Pat. application is also herein incorporated by reference for the sake of disclosure.

In the shown embodiment, a hydraulic brake system for applying braking fluid pressure to respective wheel cylinders 1a, 2a 3a and 4a includes two separate hydraulic circuits 12 and 14. One of the circuits 12 connects one of the outlet ports of a master cylinder 11 to front-right wheel cylinder 1a which is associated with the front-right wheel 1. The circuit 12 includes a branch circuit 13 connecting one of the outlet ports to the front-left wheel cylinder 2a of the front-left wheel 2. The other outlet port of the master cylinder 11 is connected to the rear-right wheel cylinder 3a and, through a branch circuit 15, to the rear-left wheel cylinder 4a. As is well known, the master cylinder 11 is mechanically coupled with a brake pedal 16 for building-up braking fluid pressure depending upon the magnitude of depression of the brake pedal. The braking fluid pressure built up in the master cylinder 11 is distributed to respective wheel cylinders 1a, 2a, 3a and 4a through the circuits 12, 13, 14 and 15 for exerting braking force to respectively associated wheels 1, 2, 3 and 4.

Anti-skid brake control valves assemblies 17a and 17b and 17c are disposed in the circuits 12, 13 and 14. As will be seen from FIGS. 1(A), 1(B) and 1(C), the anti-skid brake control valve assembly 17c is positioned upstream of the junction between the circuits 14 and 15. Therefore, braking fluid pressure to be exerted to the rear wheel cyclinders 3a and 4a is commonly controlled by means of the anti-skid brake control valve aasembly 17c. On the other hand, the anti-skid brake control valves 17a and 17b are respectively disposed in the circuits 12 and 13 at the positions downstream of the junction of the circuits 12 and 13. Therefore, the valves 17a and 17b controls braking fluid pressures at associated one of the wheel cylinders 1a and 2a, independently of each other.

The anti-skid brake control valve assembies 17a, 17b and 17c have mutually identical constructions to each other. Therefore, it would not be necessary to give a detailed description of the constructions for the valve assemblies 17a, 17b and 17c, respectively. In order to avoid redundant recitation and to avoid confusion in understanding the invention, the construction of the anti-skid brake control valve assembly 17a will only be described herebelow. The constructions of the valve assemblies 17b and 17c should be understood as indentical to that of the valve assembly 17a set out below.

The anti-skid brake control valve assembly 17a includes an inlet (EV) valve 19a, outlet (AV) valve 20a, a fluid pump 21a, accumulator 22a and one-way check valve 23a. The inlet valve 19a has an inlet port connected to the associated outlet port of the master cylinder 11 via the hydraulic circuit 12 and an outlet port connected to the front-right wheel cylinder 1a. On the other hand, the AV valve 20a has an inlet port connected to the wheel cylinder 1a and an outlet port connected to the accumulator 22a. The accumulator 22a is further connected to the hydraulic circuit 12 via the fluid pump 21a and the one-way check valve 23a for feeding back excessive fluid pressure therethrough. The fluid pump 23a is designed to draw the pressurized fluid in the associated wheel cylinder 1a to quickly reduce the braking pressure in the wheel cylinder while the anti-skid brake control is performed.

The EV valve 19a valve position is controlled the valve position by an inlet control signal $EV_1$ from a control unit 18 between closed position and open position. Similarly, the AV valve 20a valve position is controlled the valve position by an outlet control signal $AV_1$ from the control unit 18 between a closed position and an open position. Furthermore, the fluid pump 21a is connected to the control unit 18 to receive a pump drive signal MR, its operation is controlled between driving condition and resting condition.

In the preferred embodiment, the EV valve 19a is in the open position while the inlet control signal $EV_1$ is LOW level. On the other hand, the AV valve 20a is in the closed position while the outlet control signal $AV_1$ is LOW level. The anti-skid brake control valve assembly 17a is operable in APPLICATION mode, RELEASE mode and HOLD mode. In the APPLICATION mode, the inlet control signal $EV_1$ is held LOW to maintain the EV valve 19a in open position. At the same time, the outlet control valve $AV_1$ is also held LOW to maintain the AV valve 20a in the closed position. Therefore, the outlet port of the master cylinder 11 is connected to the wheel cylinder 1a through the hydraulic circuit 12 and the EV valve 19a. Therefore, the braking fluid pressure in the wheel cylinder 1a is increased proportionally to that built-up in the master cylinder. On the other hand, in the RELEASE mode, the inlet control signal $EV_1$ is switched into HIGH level to operate the EV valve 19a at the closed position. This shuts off the fluid communication between the outlet port of the master cylinder 11 and the wheel cylinder 1a therethrough. On the other hand, at this time, the outlet control signal $AV_1$ becomes HIGH level to open the AV valve 20a. As a result, fluid communication between the wheel cylinder 1a and the accumulator 22a is established. At the same time, the pump drive signal MR turns into HIGH to drive the fluid pump 21. Therefore, the fluid pressure in the accumulator 22a becomes lower than that in the wheel clinder 1a. Therefore, the braking fluid in the wheel cylinder 1a is drawn into the pressure accumulator.

On the other hand, in the HOLD mode, the inlet control signal $EV_1$ is set HIGH level to close the EV valve 19a and the outlet control signal $AV_1$ is set LOW level to maintain the AV valve 20a at closed position. Therefore, the wheel cylinder 1a is blocked from fluid communication with the master cylinder 11 and the accumulator 22a. Therefore, the fluid pressure in the wheel cylinder 1a is held constant. The relationship of the inlet and outlet control signals $EV_1$ and $AV_1$ and the pump drive signal MR will be clearly seen from the following table:

TABLE

|  | APPLICation | RELEASE | HOLD |
|---|---|---|---|
| $EV_1$ | LOW | HIGH | HIGH |
| $AV_1$ | LOW | LOW | HIGH |
| MR | — | — | HIGH |

The control unit 18 is connected to a wheel speed sensor 26a for receiving pulse signals having frequency proportional to the rotation speed of the associated wheel 1. In practice, the wheel speed sensor 26 comprises a sensor rotor adapted to rotate with the vehicle wheel and a sensor assembly fixedly secured to the shim portion of the knucle spindle. The sensor rotor is fixedly secured to a wheel hub for rotation with the vehicle wheel. The sensor rotor may be formed with a plurality of sensor teeth at regular angular intervals. The width of the teeth and the grooves therebetween are preferably equal to each other and define a unit angle of wheel rotation. The sensor assembly comprises a magnetic core aligned with a north pole near the sensor rotor and a south pole distal from the sensor rotor. A metal element with a smaller diameter section is attached to the end of the magnetic core near the sensor rotor. The free end of the metal element faces the sensor teeth. An electromagnetic coil encircles the smaller diameter section of of the metal element. The electromagnetic coil is adapted to detect a variation in the magnetic field generated by the magnetic core to produce an alternating-current sensor signal. Namely, the metal element and the magnetic core form a kind of proximity switch which adjusts the magnitude of the magnetic field depending upon the distance between the free end of the metal element and the sensor rotor surface. Thus, the intensity of the magnetic field fluctuates in relation to the passage of the sensor teeth and accordingly in relation to the angular velocity of the wheel.

Such a wheel speed sensor has been disclosed in U.S. Pat. No. 4,597,052, issued on June 24, 1986, for example. The disclosure of the U.S. Pat. No. 4,597,052 is herein incorporated by reference for the sake of disclosure.

The control unit 18 has a controller circuit section 18a for performing wheel slip control for the right-front wheel 1. Similarly, the control unit 18 has controller circuit sections 18b and 18c respectively adapted to perform wheel slip control for respectively associated left-front wheel 2 and rear wheels 3 and 4. The controller circuit section 18a receives the wheel speed indicative pulse signal from the wheel speed sensor 26a. Similarly, the controller circuit section 18b receives a wheel speed indicative pulse signal from a wheel speed sensor 26b which monitors rotation speed of the left-front wheel 2. A wheel speed sensor 26c is connected to the controller circuit section 18c for inputting whjeel speed indicative pulse signal, which monitors average rotation speed of the rear wheels 3 and 4. In order to monitor the average speed of the rear wheels, the wheel speed sensor 26c is coupled with the propeller shaft 7 for monitoring rotation speed thereof as the averation rotation speed of the rear wheels. As the anti-skid brake control valves 17a, 17b and 17c, the controller circuit sections 18a, 18b ans 18c are essentially the identical circuit constructions to each other. Therefore, the following discussion will be given only for the controller circuit section 18a. The corresponding circuit elements in the controller circuit sections 18b and 18c are represented by the same reference numerals with different suffixes which identifies the section to include the circuit elements.

As will be seen from FIG. 1, the controller circuit section 18a includes a wheel speed derivation circuit 31a and a wheel acceleration derivation circuit 32a. The wheel speed derivation circuit 31a receives the wheel speed indicative pulse signal from the wheel speed sensor 26a. Based on the frequency or pulse period of the wheel speed indicative pulse signal of the wheel speed sensor 26a and rotation radius of the right-front wheel, the wheel speed derivation circuit 31a derives an angular velocity of the right-front wheel and derives an instantaneous wheel speed $Vw_1$ of the right-front wheel 1. The wheel speed derivation circuit 31a produces a wheel speed signal indicative of the derived wheel speed $Vw_1$. The wheel acceleration derivation circuit 32a receives the wheel speed signal from the wheel speed derivation circuit 31a. The wheel acceleration derivation circuit 32a derives wheel acceleration $\alpha w_1$ and produces a wheel acceleration indicative signal. Derivation of the wheel acceleration $\alpha w_1$ on the variation of wheel speed $Vw_1$ indicated in the wheel speed signal, can be performed by differentiating the differences of the wheel speeds input at different and consecutive timing. Otherwise, the wheel acceleration may be derived directly from the wheel speed indicative pulse signal from the wheel speed sensor 26a in a manner disclosed in the aforementioned U.S. Pat. No. 4,597,052.

The wheel acceleration indicative signal of the wheel acceleration derivation circuit 32a is transmitted to a comparators 33a and 34a. In order to receive the wheel acceleration indicative signal, the comparator 33a is connected to the wheel acceleration derivation circuit 32a at an inverting input terminal. On the other hand, the comparator 34a is connected to the wheel acceleration derivation circuit 32a at a non-inverting input terminal thereof for receiving the wheel acceleration indicative signal therethrough. The wheel acceleration derivation circuit 32a is further connected to a peak detector circuit 44a which is designed for detecting a peak value of the wheel acceleration $aw_1$ and holds the peak value.

The non-inverting input terminal of the comparator 33a is connected to a reference signal generator (not shown) for receiving therefrom a deceleration threshold indicative reference signal $-b$. The deceleration threshold indicative reference signal has a value representative of a predetermined. deceleration threshold to be compared with the wheel acceleration value $\alpha w_1$. The comparator 33a normally outputs a LOW level comparator signal as long as the wheel acceleration $\alpha w_1$ is maintained higher than the deceleration threshold $-b$. The comparator 33a is responsive to the wheel acceleration $\alpha w_1$ dropping across the deceleration threshold $-b$ to output a HIGH level comparator signal.

The inverting input terminal of the comparator 34a is connected to a reference signal generator (not shown) which generates an acceleration threshold indicative reference signal having a value indicative of a predetermined wheel acceleration threshold $+a$. The comparator 34a thus compares the wheel acceleration $\alpha w_1$ as indicated in the wheel acceleration indicative signal of the wheel acceleration derivation circuit 32a with the wheel acceleration threhshold $+a$. The comparator 34a generally outputs a LOW level comparator signal while the wheel acceleration $\alpha w_1$ is held lower than the wheel acceleration threshold $+a$. The comparator 34a produces a HIGH level comparator signal when the wheel acceleration $\alpha w_1$ rises across the wheel acceleration threshold.

Another comparator 35a is provided in the controller circuit section 18a. The comparator 35a has an inverting input terminal connected the wheel speed derivation circuit 31a for receiving therefrom the wheel speed signal. The comparator 35a also has a non-inverting input terminal connected to a target wheel speed derivation circuit 28a. The target wheel speed derivation circuit 28a generally derives a target wheel speed $V\lambda$ on the basis of a vehicle speed representing value Vi and a desired optimum wheel slippage for optimizing vehicular braking efficiency. As is well known, the vehicular braking efficiency becomes maximum in a wheel slippage range of 10% to 20%. In the practical embodiment, the target wheel slippage $\lambda$ is set at 15%. On the other hand, the vehicle speed representing value Vi is derived on the basis of an instantaneous wheel speed Vw at the begining of each cycle of anti-skid brake control. The procedure of derivation of the vehicule speed representing value Vi discussed later. The target wheel speed $V\lambda$ is derived at a value of 85% of the vehicle speed representing value Vi to indicate 15% of wheel slippage. The comparator 35a maintains a LOW level comparator signal while the wheel speed Vw is maintained higher than the target wheel speed $V\lambda$. On the other hand, the comparator signal level of the comparator 35a turns HIGH when the wheel speed Vw drops across the target wheel speed $V\lambda$.

The comparator signals of the comparators 33a and 34a and 35a are fed to input terminals of an OR gate 36. The comparator 34a and 35a are also connected to an AND gate 38 to feed the comparator signals. The AND gate 38a has an inverting input terminal connected to the comparator 35a to receive therefrom the comparator signal. The comparator 35a is further connected to a variable timer circuit 42a which will be described later.

The output terminal of the OR gate 36a is connected to one input terminal of an OR gate 40a. The other input terminal of the OR gate 40a is connected to an AND gate 41a. The AND gate 41a has one input terminal connected to the variable timer 42a. Another input terminal of the AND gate 41a is connected to an oscillator 43a which serves as a clock generator. The other input terminal of the AND gate 41a is connected to a retriggerable timer circuit 30 which is desiged for producing a pump drive signal MR for driving the fluid pump 21a, 21b and 21c by applying the pump drive signal MR to pump drive motor 24 through a switching transistor The output terminal of the OR gate 40a is connected to the EV valve 19a through an amplifier 37a to feed the output thereof as the inlet control signal $EV_1$. On the other hand, the output terminal of the AND gate 38a is connected to the AV valve 20a via an amplifier 39a to feed the output as the outlet control signal $AV_1$.

A vehicle speed representing value derivation circuit 27a is connected to the wheel speed derivation circuit 31a to receive therefrom the wheel speed signal from time-to-time. The vehicle speed representing value derivation circuit 27a is also connected to the retriggerable timer circuit 30. The vehicle speed representing value derivation circuit 27a is designed to latch an instantaneous wheel speed Vw as an initial vehicle speed representing value $Vi_1$ in response to the leadinq edge of a HIGH level timer signal serving as the pump drive signal MR. The vehicle speed representing value derivation circuit 27a derives the vehicle speed representing value $Vi_1$ on the basis of the initial vehicle speed representing value corresponding to the latched wheel speed value $Vw_1$ as set forth above.

The vehicle speed representing value derivation circuit 27a is associated with other vehicle speed representing value derivation circuits 27b and 27c which derive the vehicle speed representing values $Vi_2$ and $Vi_3$ with respect to respectively associated left-front wheel 2 and rear wheels 3 and 4, in order to form the preferred embodiment of a vehicle speed representing value derivation system 27. The vehicle speed representing value derivation system 27 also includes a select-LOW switch 58 having three terminals respectively connected to the vehicle speed representing value derivation circuits 27a, 27b and 27c. The select-LOW switch 58 selects the smallest value among three vehicle speed representing values $Vi_1$, $Vi_2$ and $Vi_2$ from respective vehicle speed representing value derivation circuits 27a, 27b and 27c and outputs the selected value as a common vehicle speed representing value Vi. The common vehicle speed representing value Vi is transferred to respective target wheel speed derivation circuits 28a, 28b and 28c in the controller circuit sections 18a, 18b and 18c sothat the target wheel derivation circuits will be able to derive the target wheel speeds $V\lambda_1$, $V\lambda_2$ and $V\lambda_3$ based thereon.

On the other hand, the wheel acceleration derivation circuits 32a, 32b and 32c of the controller circuit sections 18a, 18b and 18c are connected to comparators 91a, 91b and 91c in a wheel slip detecting circuit 90. The wheel slip detecting circuit 90 is designed for detecting wheel spin during acceleration of the vehicle. Therefore, each of the comparators 91a, 91b and 91c receives the wheel acceleration indicative signal from the associated wheel acceleration derivation circuit 32a, 32b and 32c at non-inverting input terminal thereof. On the other hand, the inverting input terminal of each comparator 91a, 91b and 91c is connected to a reference signal generator (not shown) to receive therefrom a wheel slip threshold indicative reference signal having a value $a_2$ representative of a predetermined wheel spin criterion. The output terminal of the comparators 91a, 91b and 91c are respectively connected to one input terminal of OR gates 92a, 92b and 92c. The other input terminals of respective OR gates 92a, 92b and 92c are also connected to the output terminals of the associated comparators 91a, 91b and 91c through timers 93a, 93b and 93c. Each timer 93a, 93b and 93c is responsive to the trailing edge of HIGH level comparator signal from the associated comparator 91a, 91b and 91c to lbe active to output HIGH level timer signal for a predetermined period of time. The active period of the timers 93a, 93b and 93c are selected so as to cover possible longest period of time while the wheel slip (wheel-spin) is maintained. The output terminals of the OR gates 92a, 92b and 92c are connect to an OR gate 94. The OR gate 94 has an output terminal connected to the aforementioned select-LOW switch 58 of the vehicle speed representing value derivation system 18.

As will be appreciated herefrom, the signal level of the gate signal of the OR gate 94 becomes HIGH upon wheel slip (wheel spin) occurs. The select-LOW switch 58 normally distributes the vehicle speed representing values $Vi_1$, $Vi_2$ and $Vi_3$ to respectively corresponding target wheel speed derivation circuits 28a, 28b and 28c, while it is not triggered by the HIGH level gate signal from the OR gate 94 of the wheel slip detecting circuit 90. On the other hand, the select-LOW switch 58 becomes active in response to the HIGH level gate signal from the OR gate 94 to select one of the vehicle speed representing values $Vi_1$, $Vi_2$ and $Vi_3$ of the smallest value and outputs the selected one of vehicle speed representing value as the common vehicle speed representing value Vi.

Figure 2:
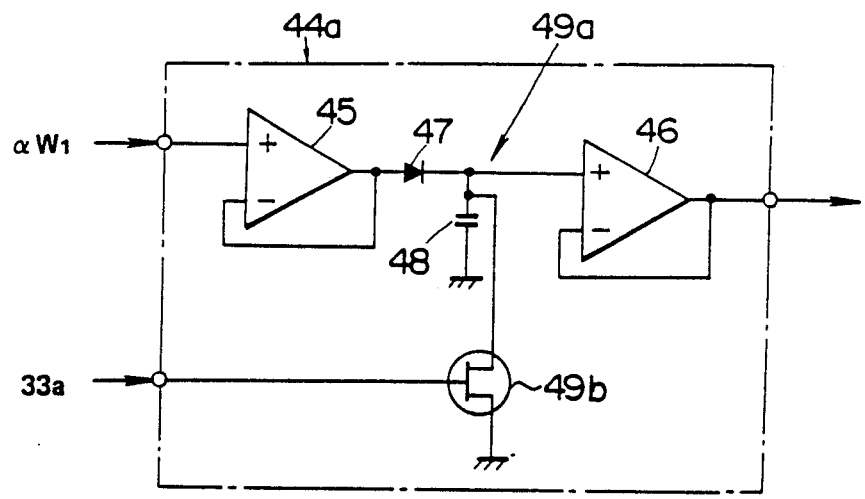
FIG. 2 is a circuit diagram of a peak detecting circuit(in the wheel speed representing value derivation circuit of FIG 1.

FIG. 2 shows detailed construction of the peak detector circuit 44a in the controller circuit section 18a set forth above. As will be seen from FIG. 2, the peak hold circuit 44a generally comprises a peak hold circuit 49a and an analog switch 49b The peak hold circuit 48 is consisted of buffer amplifiers 45 and 46, a diode 47 and a capacitor 48. The buffer amplifier 45 of the peak hold circuit 49a is connected to the wheel acceleration derivation circuit 32a to receive therefrom the wheel acceleration indicative signal having a value representative of the wheel acceleration $aw_1$, at a non-inverted input terminal. An inverting input terminal of the buffer amplifier 45 is connected to an output terminal thereof for receiving the amplifier output as feedback input. The buffer amplifier outputs through its output terminal the amplifier output indicative of one of the inputs greater than the other. The amplifier output of the buffer amplifier 45 is fed to a charge/discharge circuit consisting of the diode 47 and the capacitor 48 and to a non-inverted input terminal of the other buffer amplifier 46. Similarly to the aforementioned buffer amplifier 45, an inverting input terminal of the buffer amplifier 46 is connected to an output terminal thereof to receive the amplifier output as feedback input.

Figure 3:
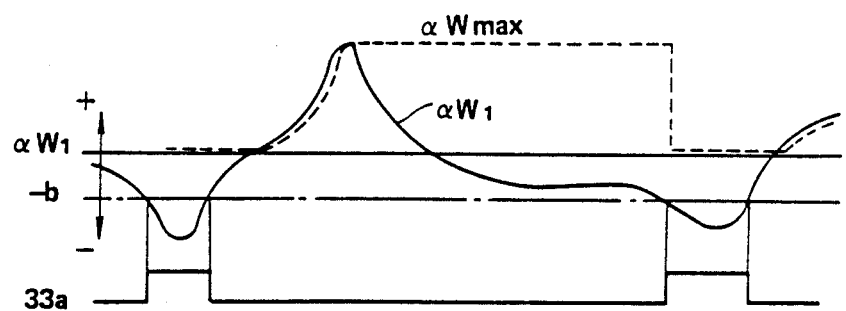
FIG. 3 is a chart showing manner of detection of the wheel speed peak to be carried out by the peak detecting circuit of FIG. 2.

The input side of the capacitor 48 is connected to the ground through the analog switch 49b. The analog switch 49b is connected to the comparator 33a. Therefore, the analog switch 49a becomes conductive at every leading edge of the HIGH level comparator signal from the comparator 33a for connecting the capacitor 48 to the ground. As a result, the potential in the capacitor 48 is discharged to the ground. Since the analog switch 49a is held conductive while the comparator signal from the comparator 33a is held at HIGH level, the potential in the capacitor 48 is maintained substantially zero during this period. The analog switch 49a becomes non-conductive in response to the trailing edge of the HIGH level comparator signal from the comparator 33a to block communication between the capacitor and the ground. As a result, the capacitor 48 starts to be charged by the amplifier output from the buffer amplifier 45. The potential in the capacitor 48 is increased as increasing of the wheel acceleration $aw_1$ and held at the value corresponding to the peak value or the wheel acceleration, as shown in FIG. 3. Therefore, the amplifier output from the buffer amplifier 46 indicates peak value $aw_{max}$ of the wheel acceleration. As set forth above, since the potential in the capacitor 48 is discharged everytime the comparator signal rises to HIGH, the peak value $aw_{max}$ output from the peak detector circuit 44a represents the peak value of the wheel acceleration $aw_1$ in each skid cycle, while the anti-skid brake control is performed.

Figure 4:
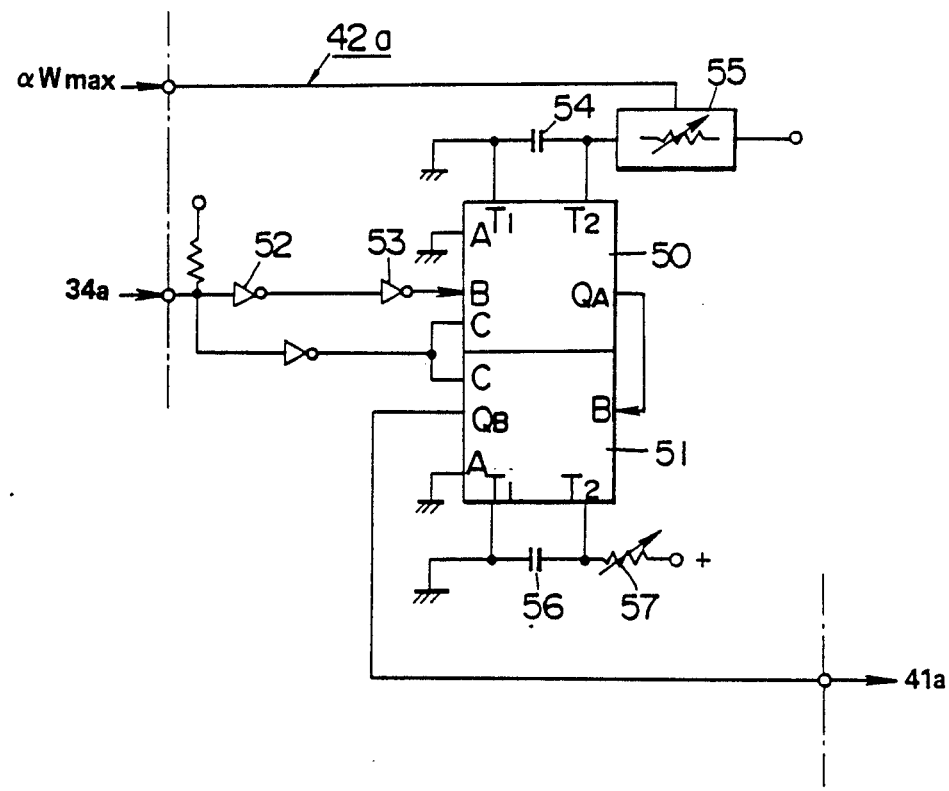
FIG. 4 is a circuit diagram of a variable timer circuit employed in the wheel slip control system of FIG. 1.

FIG. 4 shows a detailed construction of the variable timer 42a. The variable timer 42a generally comprises a first timer 51 and a second timer 52. The first timer 50 has an input port B connected to the output terminal of the comparator 34a through an inverter 52 to receive therefrom the inverted comparator signal. The first timer 50 is designed to be triggered in response to the trailing edge of the HIGH level input at the input port B to output timer signal $Q_A$ for a given period of time $T_1$. The period $T_1$ to maintain the timer signal $Q_A$ is determined by a time constant derived from a capacity of a capacitor 54 and a resistance of a variable resistor 55 connected to the terminals $T_1$ and $T_2$ of the first timer 50. The variable resistor 55 is connected to the aforementioned peak detector circuit 44a to receive therefrom the amplifier output as a wheel acceleration peak indicative input. The resistance of the variable resistor 55 is adjusted depnding upon the peak value $aw_{max}$ as indicated in the wheel acceleration peak indicative signal. Therefore, the timer period of the first timer 50 is variable in proportion to the magnitude of the peak value $aw_{max}$.

Figure 5:
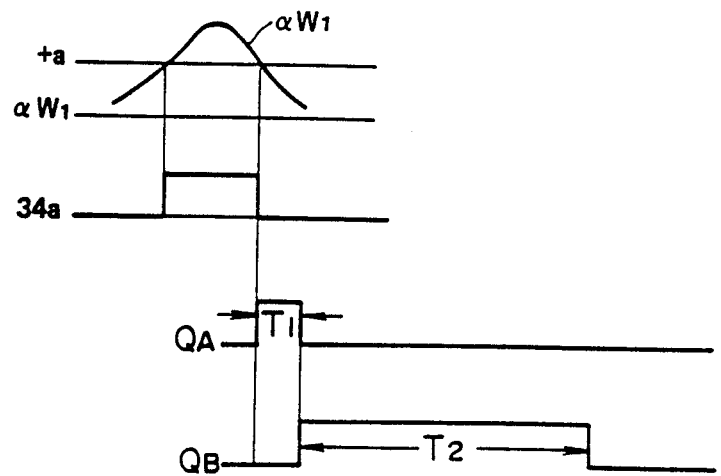
FIG. 5 is a chart showing operation of the variable timer circuit of FIG. 4.

The timer signal $Q_A$ of the first timer 50 is fed to a B input port of the second timer 51. The second timer 51 has a time constant circuit consisted of a capacitor 56 and a variable resistor 57 for providing a timer period $T_2$. The time constant of the time constant circuit of the capacitor 56 and the variable resistor 57 is set constant to set the timer period $T_2$ constant. Therefore, the second timer 52 is triggered by the trailing edge of the HIGH level input at the B input terminal. The second timer 51 as triggerd outputs HIGH level timer signal for the timer period determined by the time constant of the time constant circuit of the capacitor 56 and the variable resistor 57, through $Q_B$ output terminal for the given period of time $T_2$, as shown in FIG. 5.

Figure 6:
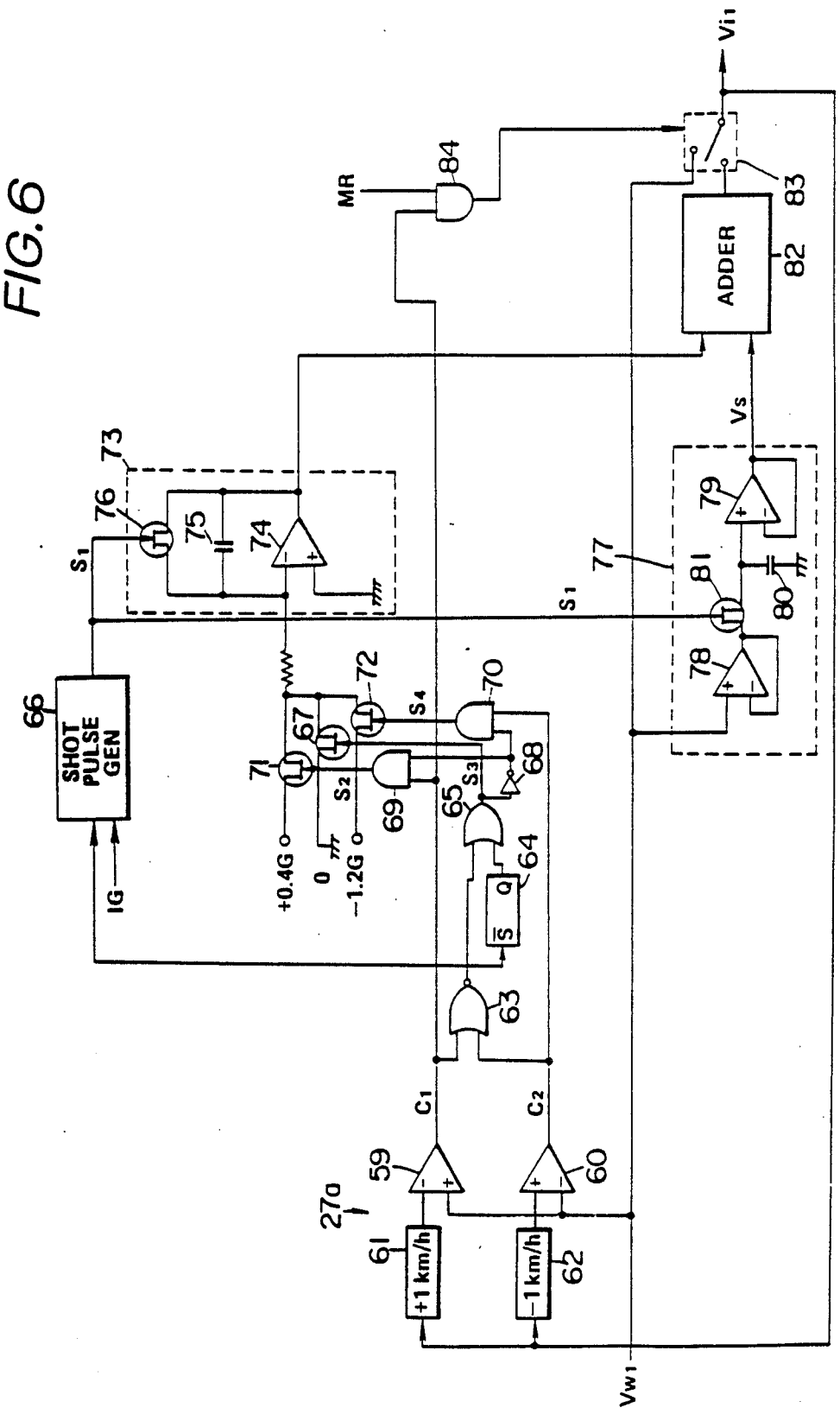
FIG. 6 is a blobvk diagram of the preferred embodiment of the vehicle speed representing value derivation circuit in the wheel slip control system of FIG. 1.

FIG. 6 shows the detailed construction of the vehicle speed representing value derivation circuit 27a. As set forth above, the vehicle speed representing value derivation circuit 27a derives a vehicle speed representing valve $Vi_1$ based on the wheel speed $Vw_1$ as indicated in the wheel speed signal from the wheel speed derivation circuit 31a. The vehicle speed representing value derivation circuit 27a includes comparators 59 and 60. The comparator 59 has a non-inverting input terminal connected to the wheel speed derivation circuit 31a. On the other hand, the comparator 60 is connected to the wheel speed derivation circuit 31a at an inverting input terminal. An inverting input terminal of the comparator 59 is connected to output terminal of the vehicle speed representing value derivation circuit 27a through which the vehicle speed representing value $Vi_1$ is output, through an adder 61. On the other hand, the non-inverting input terminal of the comparator 60 is connected to the output terminal of the vehicle speed representing valve derivation circuit 27a through a subtractor 62. The adder 61 is designed to add a given value corresponding to 1 km/h of vehicle speed to the vehicle speed representing value $Vi_1$ for providing dead band of $+1$ km/h. Similarly, the subtractor 672 subtracts a given value corresponding to 1 km/h of the vehicle speed from the vehicle speed representing value $Vi_1$ for providing dead band of $-1$ km/h. The comparator 59 outputs HIGH level comparator signal when the wheel speed $vw_1$ is higher than or equal to the vehicle speed representing valve $Vi_1 - 1$ km/h. In other words, the comparator signal level of the comparator 59 is held LOW as long as the wheel speed $Vw_1$ is maintained lower than the vehicle speed representing value $Vi_1 + 1$ km/h. The comparator 60 outputs HIGH level comparator signal when the wheel speed $vw_1$ is lower than to the vehicle speed representing value $Vi_1 - 1$ km/h. In other words, the comparator signal level of the comparator 59 is held LOW as long as the wheel speed $Vw_1$ is maintained higher than or equal to the vehicle speed representing value $Vi_1 - 1$ km/h.

The output terminals of the comparators 59 and 60 are connected to input terminals of NOR gate 63 to feed the comparator signals $C_1$ and $C_2$ thereto. The NOR gate 63 outputs HIGH level gate signal while signal levels of both or the comparator signalS $C_1$ and $C_2$ are maintained LOW. Namely, the gate signal output from the NOR gate 63 is held LOW while the wheel speed $Vw_1$ is maintained higher than or equal to the vehicle speed representing valve $Vi_1 - 1$ km/h and lower than the vehicle speed representing value $Vi_1 - 1$ km/h. The gate signal of the NOR gate 63 is fed to a timer 64, an OR gate 65 and a shot-pulse generator 66, respectively.

The timer 64 is responsive to the trailing edge of the HIGH level NOR gate signal to output a timer signal for a given period of time $T_3$, e.g. 0.1 sec. The timer signal is fed to the OR gate 65.

The OR gate 65 thus receives the NOR gate signal at one input terminal and the timer signal from the timer 64 at the other input terminal. An OR gate signal of the OR gate 65 is transmitted to a gate of an analog switch 67 as a selector signal $S_3$. The output terminal of the OR gate 65 is also connected to one input terminal of an AND gates 69 and 70 via an inverter 68. The other input terminal of the AND gate 69 is connected to the output terminal of the comparator 59 to receive therefrom the comparator signal $c_1$. Similarly, the other input terminal of the AND gate 70 is connected to the output terminal of the comparator 60 to receive the comparator signal $c_2$ therefrom. Therefore, the gate signal $S_2$ of the AND gate 69 becomes HIGH while the comparator signal $c_1$ is maintained at HIGH level and the NOR gate signal is held LOW. The gate signal $S_2$ serves as a selector signal. On the other hand, the gate signal $S_4$ of the AND gate 70 becomes HIGH level while the comparator signal $c_2$ is maintained HIGH and the NOR gate signal is held LOW. This gate signal $S_4$ also serves as selector signal. The AND gates 69 and 70 are connected to gates of analog switches 71 and 72.

The analog switch 67 is turned ON in response to HIGH level selector signal $S_3$ to drop the supply voltage to an integrator circuit 73 to zero. On the other hand, the analog switch 71 is turned ON in response to the HIGH level selector signal $S_2$ to supply a voltage E corresponding to a possible maximum wheel acceleration, e.g. 0.4 G, to the integrator circuit 73. The analog switch 72 is likewise turned ON in response to the HIGH level selector signal $S_4$ to supply a voltage corresponding to possible minimum wheel acceleration value, e.g. $-1.2$ G, to the integrator circuit 73.

The integrator circuit 73 has a per se well known construction and is consisted of an amplifier 74, a capacitor 75 and an analog switch 76. The gate of the analog switch 76 is connected to the shot-pulse generator 66 to receive therefrom a shot-pulse which serves as a reset signal $S_1$. The integrator 73 is reset by the HIGH level reset signal $S_1$ and is responsive to the trailing edge of the HIGH level reset signal to reset the integrated value. The integrator circuit 73 integrates the supply voltage E after termination of the HIGH level reset signal $S_1$ to output the integrator signal. The shot-pulse generator 66 is responsive to an ON-set signal IG of an ignition switch to generate a first shot pulse is the first reset signal for resetting the integrator circuit 73. The shot-pulse generator 66 subsequently generates the shot-pulses serving as the reset signal $S_1$ every leading edge of the HIGH level NOR gate signal. As set forth above, since the NOR gate signal becomes HIGH when the wheel speed $Vw_1$ satisfies $(Vi_1 - 1 \text{ km/h}) \leq Vw_1 < (-Vi_1 + 1 \text{ km/h})$, the integrated value of the integrator 73 is reset every occurence of the wheel speed $Vw_1$ in the aforementioned range. The reset signal $S_1$ of the shot-pulse generator 66 is also supplied to a sample hold circuit 77. The sample hold circuit 77 comprises buffer amplifiers 78 and 79, a capacitor 80 and an analog switch 81. The analog switch is connected to the shot-pulse generator 66 to receive the reset signal $S_1$ at the gate thereof to be turned ON. The sample hold circuit 77 is responsive to turning ON of the analog switch 81 to reset the held wheel speed value. The sample hold circuit 77 in absence of the reset signal $S_1$ from the shot-pulse generator 66, samples and holds the instantaneous wheel speed value Vw$_1$ at the occurence of the reset signal as a sample value Vs. The sample hold circuit 77 outputs a sample/hold signal having a value indicative of the sample value Vs to an adder 82. The adder receives the sample/hold signal from the sample hold circuit 77 and integrator signal from the integrator 73. As will be appreciated, the integrator signal has a value indicative of an integrated value Ve $$\left( = \int_0^t (-E) \cdot dt \right).$$

Therefore, the adder 82 adds the integrated value ve to the sample value Vs to derive the vehicle speed representing value Vi$_1$. The output terminal of the adder 82 is connected to a switching circuit 83. The switching circuit 83 is also directly connected to the wheel speed derivation circuit 31a to be input the wheel speed signal. On the other hand, the switching circuit 83 also connected to an AND gate 84. The AND gate 84 has one input terminal connected to a retriggerable timer 30 to receive therefrom the pump drive signal MR. The other input terminal of the AND gate 84 is connected to the output terminal of the comparator 59. The AND gate 84 controls the switch position of the switching circuit 83 to selectively connect the wheel speed derivation circuit 31a or the adder 82 to the output terminal of the vehicle speed representing value derivation circuit 27a.

Namely, the gate signal of the AND gate is normally maintained LOW level due to absence of the HIGH level pump drive signal MR. The gate signal of the AND gate is also held LOW level while the wheel acceleration is negative or that the wheel speed Vw$_1$ is lower than the Vi$_1$+1 km/h value as compared in the comparator 59. While the gate signal is held LOW, the switching circuit 82 is held at a first switch position where the adder 82 is connected to the output terminal of the vehicle speed representing value derivation circuit therethrough. On the other hand, when the HIGH level pump drive signal MR and the HIGH level comparator signal of the comparator 59 are both input to the AND gate, the gate signal of the AND gate 84 turns HIGH to switch the switching circuit 83 to a second switch position where the wheel speed derivation circuit 31a is directly connected to the output terminal of the vehicle speed representing value derivation circuit 27a.

Figure 7:
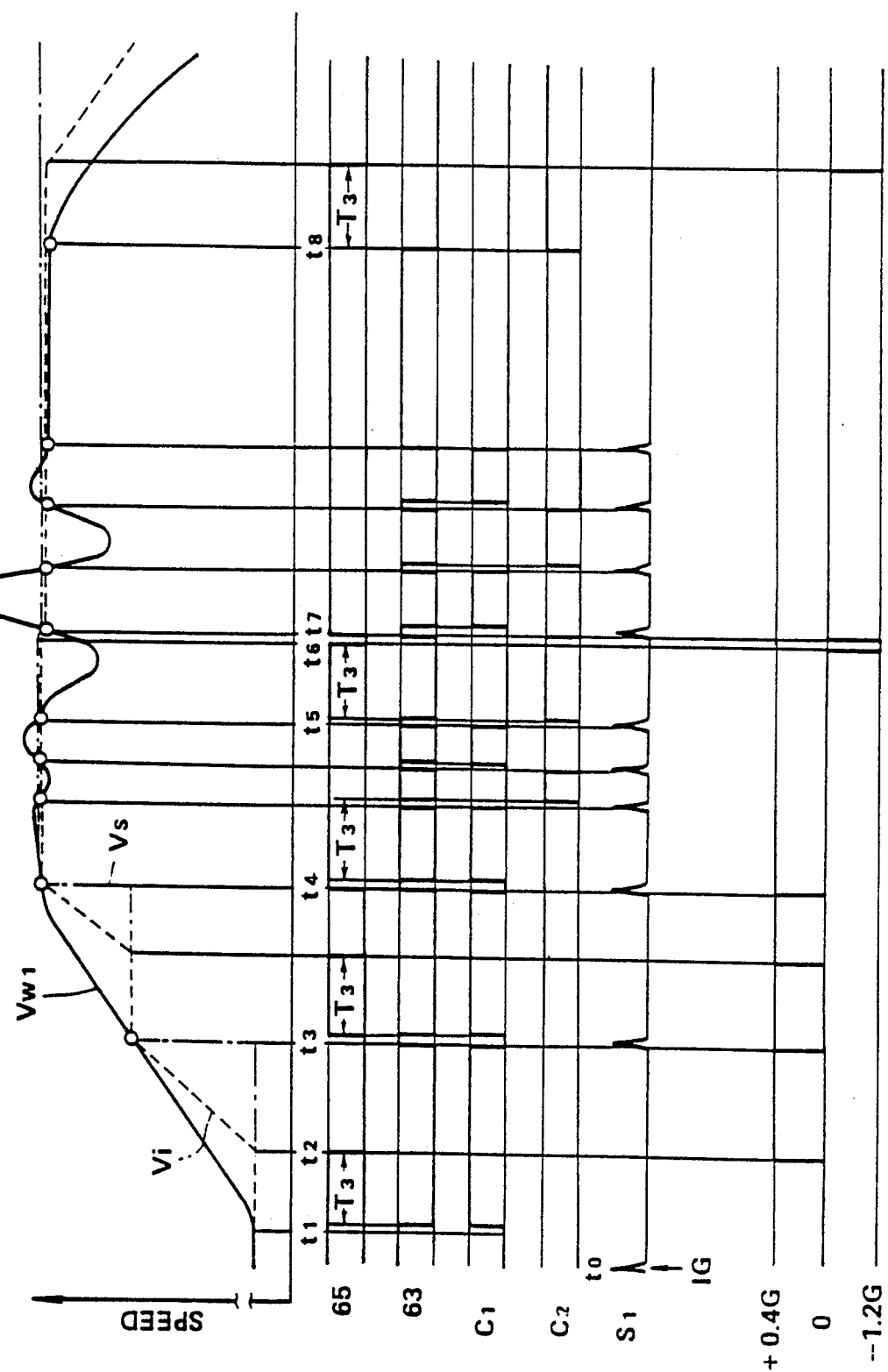
FIG. 7 is a timing chart showing operation of the vehicle speed representing value derivation circuit of FIG. 6.

Operation of the vehicle speed representing derivation circuit 27a will be described herebelow with reference to FIG. 7. In FIG. 7, the operation of the vehicle speed representing value derivation circuit 27a is described in a condition where the gate signal level of the AND gate 84 is maintained LOW level due to absence of the HIGH level pump signal MR or the comparator signal c$_1$ from the comparator 59 is held LOW. At this condition, by the LOW level gate signal of the AND gate 84, the switching circuit 83 is switched at a switch position where the adder 82 is connected to the output terminal of the vehicle speed representing value derivation circuit.

In the process of FIG. 7, the engine is started up at a time t$_0$. In response thereto, the On-set signal IG is input to the shot pulse generator 66. Therefore, the shot pulse s$_1$ is output at the time t$_0$ from the shot-pulse generator 66. With the shot pulse at the time t$_0$, the sample hold circuit 77 is reset. The sample/hold circuit 77 as reset by the shot pulse s$_1$ at the time t$_0$, samples and holds the wheel speed signal value Vw$_1$ as sample value Vs. Therefore, after the timer t$_0$, the held sample value Vs is output from the sample hold circuit 77 as an initial vehicle speed representing value. At the same time, i.e. at the time t$_0$, the integrator circuit 73 is reset by the reset signal s$_1$. Therefore, the value Ve of the integrator signal of the integrator circuit 73 drops to zero. As a result, the output value Vi$_1$ from the adder 82 becomes that equal to the held initial vehicle speed representing value Vs, as shown by broken line in FIG. 7.

At this time, the comparator signals c$_1$ and c$_2$ of the comparators 59 and 60 are maintained LOW level. Therefore, the NOR gate signal of the NOR gate 63 is maintained HIGH level. Therefore, the gate signal level of the OR gate 65 is maintained HIGH level and the gate signal is fed to the analog switch 67 as the select signal S$_3$. Therefore, the analog switch 67 is turned ON by the HIGH level gate signal from the OR gate 65. On the other hand, the HIGH level gate signal of the OR gate 65 is fed to the AND gates 69 and 70 through the inverter 68. Therefore, the select signals S$_2$ and S$_4$ of the AND gates 69 and 70 are held LOW to maintain the analog switches 71 and 72 at OFF position. Since the analog switch 67 serves to maintain the input level at the inverting input terminal of the comparator 74 in the intergrator circuit 73 zero, the integrated value of the integrator circuit 73 is maintained zero. As a consequence, the output value of the adder 82 as the vehicle speed representing value Vi is maintained at the equal value to the initial vehicle speed representing value as the sample value Vs.

After the vehicle starts running, the wheel speed Vw becomes greater than or equal to Vi$_1$ +1 km/h, at a time t$_1$. In response to this, the comparator signal of the comparator 59 turns HIGH level. By the HIGH level comparator signal c$_1$ from the comparator 59, the gate signal of the NOR gate 63 turns LOW. At this time, since the timer 64 becomes active to output HIGH level timer signal for a period of time T$_3$, the gate signal level o the OR gate 65 is maintained HIGH level for the corresponding T$_3$ period. Therefore, the select signal S$_3$ is maintained HIGH level and the selector signals S$_2$ and S$_4$ are held at LOW level. Therefore, even after the vehicle starts running the vehicle speed representing value Vi$_1$ is held at the equal value to the sample value Vs for the T$_3$ period.

After expiration of the T$_3$ period, at a time t$_2$, the gate signal of the OR gate 65 turned into LOW level due to termination of the HIGH level timer signal from the timer 64. Since the comparator signal c$_1$ and the inverted gate signal from the OR gate 65 through the inverter 68 are both becomes HIGH level, the selector signal S$_2$ of the AND gate 69 turns HIGH. At the same time, because of LOW level gate signal of the OR gate 65 is applied to the gate of the analog switch 67 as the select signal S$_3$ to turn the latter OFF. At this time, since the comparator signal from the comparator 60 is maintained LOW level, the AND gate 70 is maintained non-conductive to feed the LOW level select signal S$_4$. Therefore, only analog switch 71 is turned ON to input a value corresponding to wheel acceleration magnitude of 0.4 G. This value, e.g. 0.4 G serves for defining inclination of the vehicle speed representing valuie Vi$_1$. The integrator circuit 73 thus receives the value (0.4 G) through the analog switch 71 to output the integrator signal having a value Ve as set forth above. Therefore, the output value of the adder 82 increases from time-to-time as increasing of the integrator signal value Ve.

At a time $t_3$, the vehicle speed representing value $Vi_1$ (=Vs+Ve) reaches a value to establish $Vw_1 < Vi_1 + 1$ km/h. Then, the comparator signal $c_1$ turns into LOW level. Therefore, the gate signal level of the NOR gate 63 again turns into HIGH level. The shot-pulse generator 66 is triggered by the leading edge of the HIGH level gate signal of the NOR gate to output the shot pulse serving as the reset pulse $S_1$. Therefore, the sample hold circuit 77 and the integrator circuit 73 are reset. At the same time, the instantaneous wheel speed $Vw_1$ at the time $t_3$ is sampled and held in the sample hold circuit 77 as the renewed sample value Vs. By renewing the sample value Vs, the vehicle speed representing value $Vi_1$ becomes equal to the instantaneous wheel speed value $Vw_1$ and thus establishes $Vw_1 \geq Vi + 1$ km/h. Therefore, the comparator signal $c_1$ again turns ON at the time $t_3$. Similarly to the control behavior at the period from $t_1$ to $t_3$, the gate signal of the OR gate 65 is held HIGH for the $T_3$ period by HIGH level timer signal of the timer 64. Similarly, at the time $t_4$, the shot-pulse generator 66 is triggered to output the reset signal $S_1$ to renew the sample value Vs by the instantaneous wheel speed $Vi_1$ at the time $t_4$. After the time $t_4$, the sampled value Vs is maintained constant for the given period $T_3$ by the HIGH level timer signal of the timer 64. Before the HIGH level timer signal terminates, the shot pulse as the reset signal is generated by the shot pulse generator 66, as shown in FIG. 7. While the interval of the shot pulse of the shot pulse generator 66 is shorter than the timer period $T_3$, the integrated value of the integrator 73 is maintained zero. Therefore, the adder outputs the sampled value Vs as the vehicle speed representing value $Vi_1$.

After a time $t_5$, at which the reset signal $s_1$ is produced for resetting the sample hold circuit 77 and the intergrator 73, the gate signal of the OR gate turns LOW at a time $t_6$ after expeiration of the timer period $T_3$. During the period between the times $t_5$ and $t_6$, the wheel speed $Vw_1$ drops to be lower than $(Vi_1 - 1$ km/h). Since the wheel speed $Vw_1$ is maintained lower than the value $(Vi_1 - 1$ km/h) at the time $t_6$, the comparator signal $c_1$ of the comparator 59 is maintained LOW and the comparator signal $c_2$ of the comparator 60 is maintained HIGH. Therefore, the analog switch 71 is held OFF and the analog switch 72 is turned ON. Therefore, a value corresponding to a predetermined deceleration magnitude of $-1.2$ G is input through the analog switch 72. Consenquently, the integrated value in the integrator 73 becomes negative. The negative integrated value is summed with the sample value Vs which corresponds to the instantaneous wheel speed $Vw_1$ at a time $t_5$ to gradually reduce the value of the vehicle speed representing value $Vi_1$. At a time $t_7$, the wheel speed $Vw_1$ is increaseed across the value $(Vi_1 + 1$ km/h). As a result, the signal $s_1$ generated by the shot pulse generator 66. Then sample hold circuit 77 and the integrator 73 are thus reset.

At a time $t_8$, braking operation is initiated to abruptly decelerate the vehicle. As a result, the wheel speed $Vw_1$ drops across the value of $(Vi_1 - 1$ km/h). By this, the comparator signal $c_2$ of the comparator rises to HIGH level to destroy the NOR condition at the NOR gate 63. Therefore, the NOR gate signal of the NOR gate turns into LOW level. The timer 64 is thus triggered by the trailing edge of the HIGH level NOR gate signal to output HIGH level timer signal for the timer period $T_3$. After expiration of the timer period $T_3$, the value corresponding to the deceleration magnitude of $-1.2$ G is input to the integrator. Therefore, the vehicle speed representing value $Vi_1$ is gradually decreased.

Figure 8:
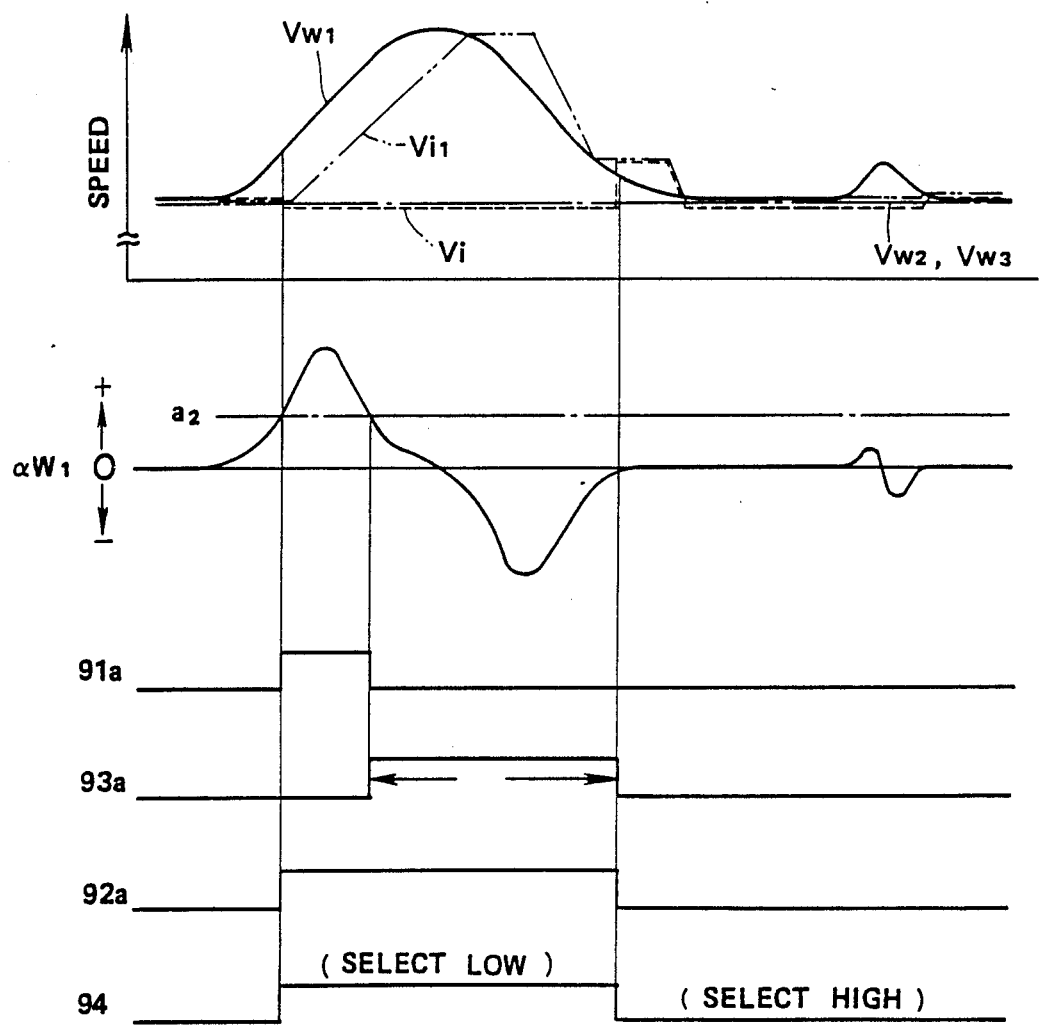
FIG. 8 is a timing chart showing operation of a wheel slip detecting circuit for detecting wheel slip during acceleration, which wheel slip detecting circuit being employed in the wheel slip control system of FIG. 1.

FIG. 8 shows a timing chart showing operation of the acceleration slip detector circuit 90 employed in the preferred embodiment of the anti-skid brake control system according to the invention. As will be seen herefrom, while the, wheel accleration $\alpha w_1$ is maintained HIGH compared to the wheel slip threshold $+a_2$, the comparator signal of the comparator $91a$ is maintained at HIGH level. On the other hand, since the timer $93a$ is triggered by the trailing edge of the HIGH level comparator signal of the comparator $91a$ to output the HIGH level timer signal for the given period of time $T_4$. Therefore, the gate signal of the OR gate $92a$ is maintained HIGH level until the timer period $T_4$ of the timer $93a$ expires. During the period while the OR gate signal of the OR gate $92a$ is maintained at HIGH level, the selector switch 58 is maintained at select LOW position by HIGH level gate signal from the OR gate 94. On the other hand, while the gate signal of the OR gate 94 is maintained LOW level, the selector switch 58 is held at select HIGH position.

Figure 9:
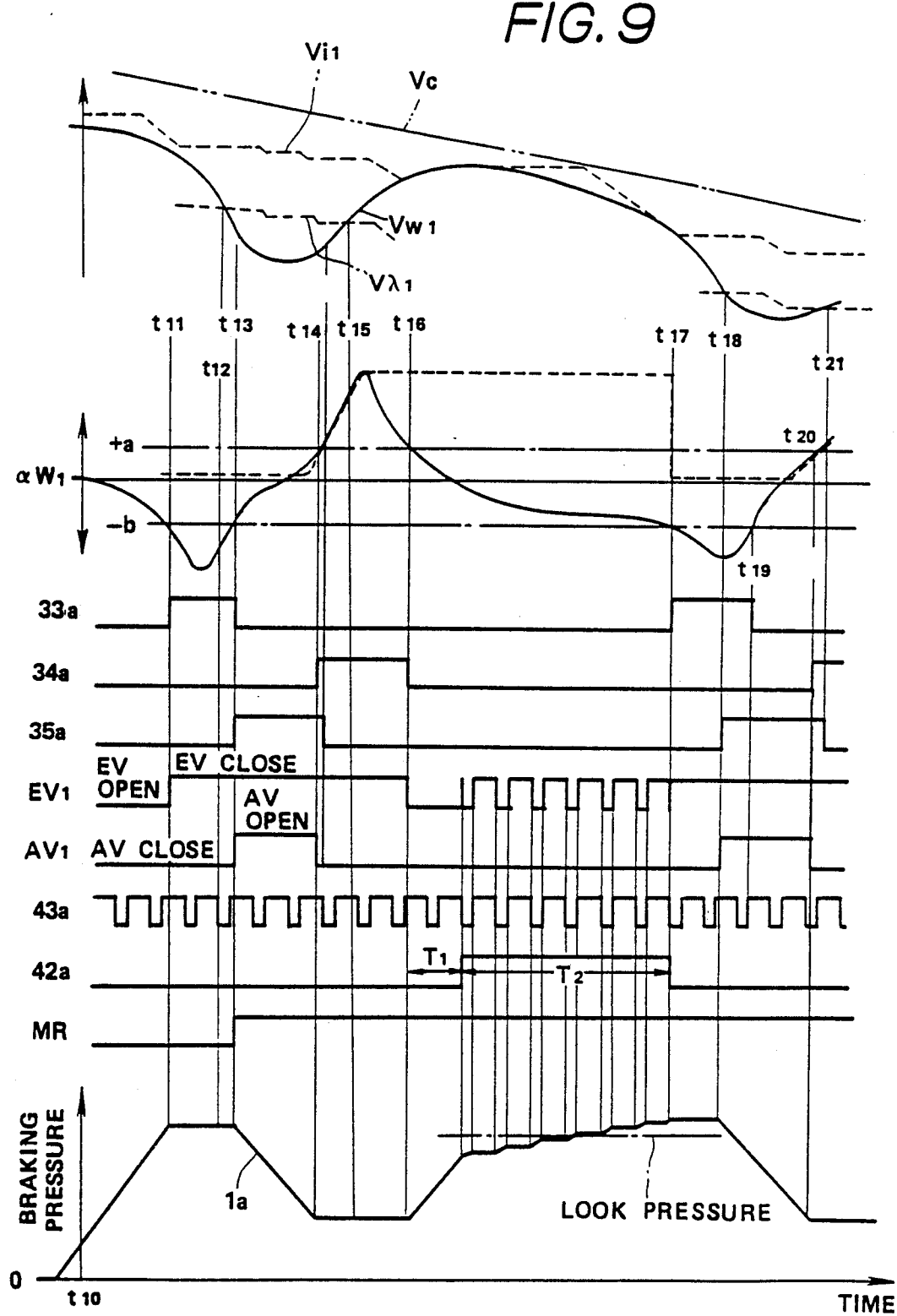
FIG. 9 is a timing chart sshowing operation of the anti-skid brake control to be performed by the wheel slip control system of FIG. 1.

FIG. 9 shows a timing chart of the operation of the controller circuit section $18c$ in anti-skid brake control for the rear wheels.

It is assumed that vehicular brake is applied for deceleration of the vehicle at a time $t_{10}$, hydraulic braking pressure is built up and distributed to all of the wheel cylinders $1a$, $2a$, $3a$ and $4a$ in common. According to the increasing of the braking pressure in the wheel cylinders $3a$ and $4a$, the rear wheels 3 and 4 are decelerated.

At a time $t_{11}$, the wheel acceleration $aw_3$ decreases across the wheel deceleration threshold $-b$. This results in initiation of anti-skid brake control. Namely, since the wheel acceleration $aw_3$ becomes smaller than the wheel deceleration threshold $-b$, the comparator signal of the comparator $33c$ turns into HIGH level. This turns the gate signals of the OR gates $36c$, $40c$ and $40d$ into HIGH level. Therefore, the inlet control signal $EV_3$ output through the amplifier $37c$ turns HIGH level. Therefore, both of the EV valves $19c$ and $19d$ are shut at the time $t_{11}$. At this time, since the output of the AND gate $38c$ is held LOW level, the outlet control signal $AV_3$ is held LOW. Therefore, the AV valves $20c$ and $20d$ are also maintained at closed position. Therefore, the anti-skid brake control valve assemblies $17c$ and $17d$ are placed in HOLD mode position. The braking pressure in the wheel cylinders $3a$ and $4a$ are thus held constant at the pressure level at the time $t_{11}$.

For the initial cycle of the anti-skid brake control, the vehicle speed representing value Vi iS derived by the vehicle speed representing value derivation system 27. Based on the common vehicle speed representing value Vi, the target wheel speed $V\lambda_3$ is derived at a value 85% of Vi. As described above, since the vehicle speed representing value decreases according to the integrated value of the integrator 73, the target wheel speed $V\lambda_3$ decreases continuously. At a time $t_{12}$, the lower rear wheel speed $Vw_R$ decelerated across the target wheel speed $V\lambda_3$. Then, the comparator signal of the comparator $35c$ turns into HIGH level. At this time, since the comparator signal of the comparator $34c$ is held LOW to apply HIGH level input to the AND gate $38c$ through the inverting input terminal, AND condition is established at the AND gate $38c$. Therefore, the gate signal of the AND gate 38c turns into HIGH level to cause HIGH level outlet control signal AV$_3$. This operates the anti-skid brake control valve assemblies 17c and 17d into the RELEASE mode position. Therefore, the braking pressure in the wheel cylinders 3a and 4a are released by feeding back the pressurized braking fluid to the pressure accumulators 22c and 22d. At the same time, by the HIGH level outlet control signal AV$_3$, the retriggerable timer 30 is triggered to start outputting of the pump drive signal MR. Therefore, the pump motor 24 is started to drive the fluid pumps 21c and 21d.

By decreasing the braking pressure in the wheel cylinders 3a and 4a, the wheel speed Vw$_3$ is resumed and therefore wheel acceleration aw$_3$ is increased. The wheel acceleration αw$_3$ increases across the wheel deceleration threshold −b at a time t$_{13}$. Therefore, the comparator signal of the comparator 33c turns into LOW level at the time t$_{13}$. However, at this time, since the HIGH level comparator signal is input to the OR gate 36 is maintained HIGH level. Therefore, the gate signal of the OR gate 40c is held HIGH to maintain the inlet control signal EV$_3$ at HIGH level. Therefore, the anti-skid control valve assemblies 17c and 17d are maintained at the RELEASE mode, at the time t$_{13}$. Thus, the wheel speeds Vw$_3$ are continued to increase. Accordingly, the wheel acceleration αw$_3$ increases. At a time t$_4$, the wheel acceleration αw$_3$ increases across the wheel acceleration threshold +a. This results in HIGH level comparator signal of the comparator 34c. This HIGH level comparator signal of the comparator 34c turns the input level at the inverting input terminal of the AND gate 38c into LOW level. Therefore, the AND gate signal of the AND gate 38c turns into LOW level. Therefore, the outlet control signal AV$_3$ turns into LOW level to close the AV valves 20c and 20d in the anti-skid brake control valve assemblies 17c and 17d. As a result, the anti-skid brake control valve assemblies 17c and 17d are again placed into the HOLD mode to maintain the braking pressure level constant at the pressure level at the time t$_{14}$. By holding the braking pressure at decreased level, the wheel speed Vw$_3$ still increases. Also, according to increasing of the wheel speed, wheel acceleration aw$_3$ increases toward the peak aw$_{max}$. As seen from FIG. 10, the rear wheel speed Vw$_3$ increases across the target wheel speed Vλ$_3$ at a time t$_{15}$. This results in LOW level comparator signal of the comparator 35c. After this, at a time 16, the wheel acceleration αw$_3$ drops across the wheel acceleration threshold +a. In response to drop of the wheel acceleration αw$_3$ across the wheel acceleration threshold +a, the comparator signal of the comparator 34c turns into LOW level. Therefore, all of the inputs to the OR gate 36c becomes LOW level. Therefore. the OR gate signal of the OR gate 36c turns into LOW level to cause LOW level inlet control signal EV$_3$ at the time t$_{16}$. At the same time, the variable timer 42c is activated by the trailing edge of the HIGH level comparator signal of the comparator 34c to output HIGH level timer signal for a period T$_2$ after a delay time T$_1$ which is variable depending upon the wheel acceleration peak value as latched by the peak hold circuit 44c. During the period T$_2$, the oscillator 43c is triggered to output constant pulse signals. As will be appreciated, while the pulse signal is maintained ON (HIGH) level, AND conditions are established in the AND gate 41c to maintain the inlet control signal EV$_3$ at HIGH level. Therefore, during the delay time T$_1$, the anti-skid brake control valves 17c and 17d are held in APPLICATION mode to increase the braking pressure. On the other hand, during the period T$_2$, the operation mode of the anti-skid brake control valves 17c and 17d are alternated between APPLICATION mode and HOLD mode repeatedly.

At a time t$_{17}$, the wheel acceleration αw$_3$ drops across the wheel deceleration threshold −b. Therefore, another cycle of anti-skid brake control is initiated. At the same time, the peak hold circuit 44c is reset by the leading edge of the HIGH level comparator signal of the comparator 33c. Thereafter, one skid cycle of anti-skid brake control operation is performed during the period t$_{17}$ to t$_{22}$.

As will be appreciated herefrom, the anti-skid brake control to be taken place for releasing the braking pressure in both of the rear wheel cylinders in response to decreasing of the lower rear wheel speed Vw$_R$ across the target wheel speed Vλ$_3$ in synchronism with each other and at the same rate. On the other hand, in the APPLICATION mode, the braking pressures in the rear wheel cylinders are built up at different rate to each other. As a result, when one of the wheel is decelerated across the target wheel speed, the other wheel is rotating at higher speed than the target wheel speed. Therefore, it is successfully avoided to cause locking of both wheels at the same time. This assures derivation of the vehicle speed representing value Vi$_3$ at the value precisely reflecting the vehicle speed to allow precise control for the brake.

Figure 10:
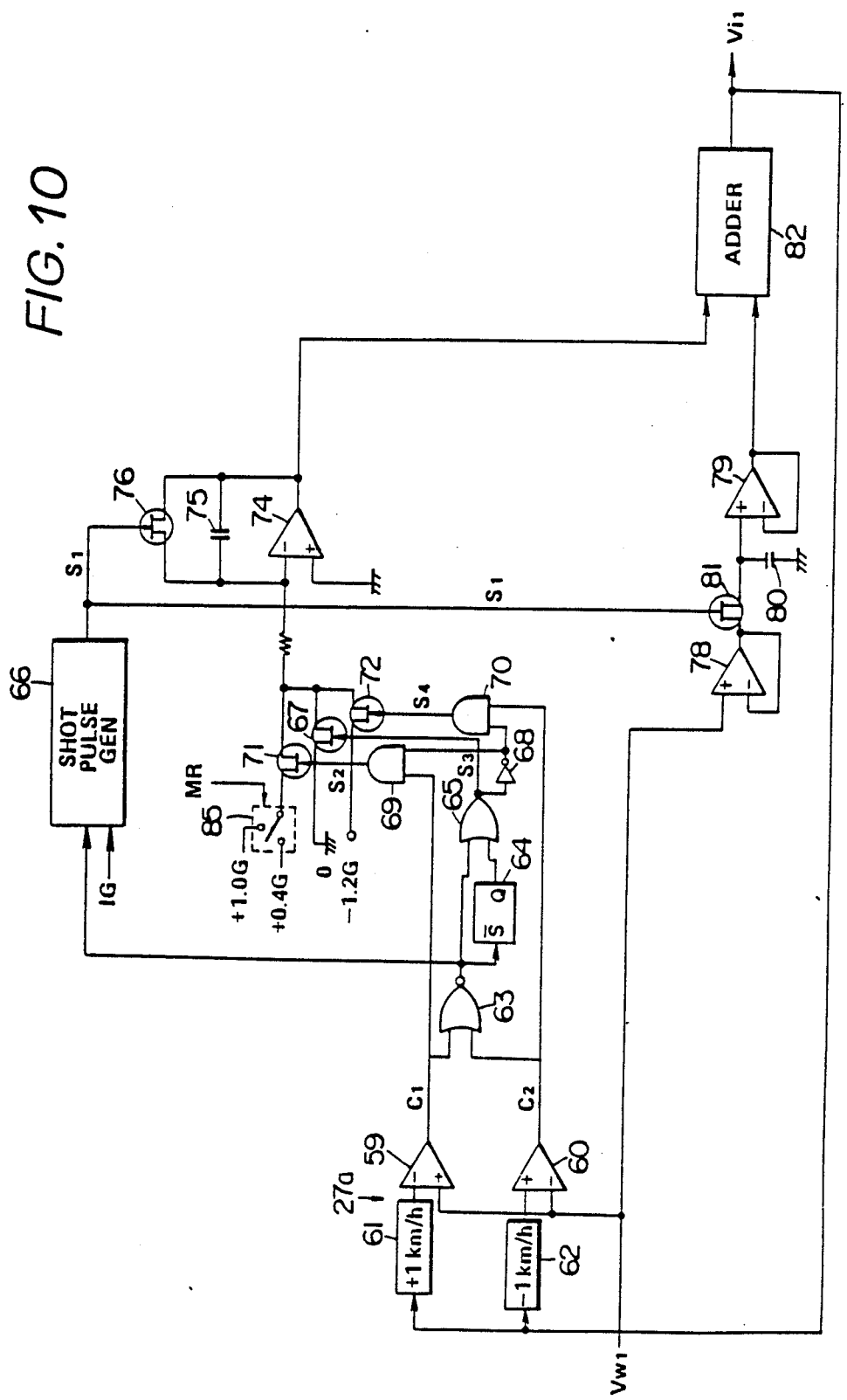
FIG. 10 is a block diagram of another embodiment of the preferred embodiment of the vehicle speed representing value derivation circuit of the invention.

For instance. FIG. 10 shows a modification of the aforementioned vehicle speed representing value derivation circuit 27a, 27b, 27c and 27d. In this modified embodiment, the wheel acceleration indicative value to be introduced to the integrator 73 is variable between +1.0 G and +0.4 G through the analog switch 71. For selectively introducing the +0.4 G value and +10 G value, a selector switch 85 is provided. The selector switch 83 is normally in a position to pass the +0.4 G value to the integrator 73 and is responsive to HIGH level pump drive signal MR to turn the switch position to pass the +1.0 G value. In the modification, the switch 83 is neglected.

Figure 11A:
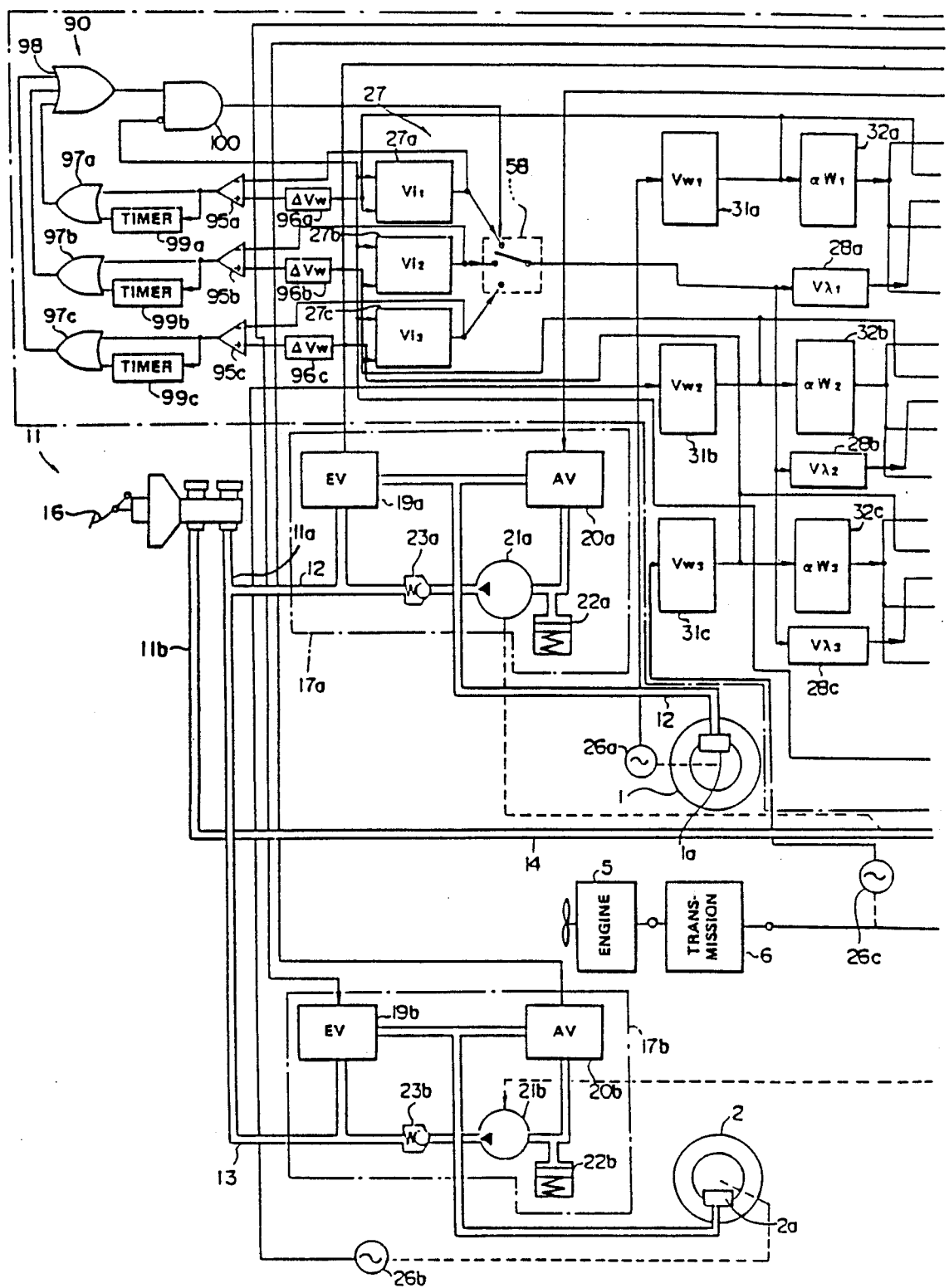
FIGS. 11(A) and 11(B) are is a block diagrams of another example of wheel slip control system, to which the preferred embodiment of the, vehicle speed representing value derivation system, is applicable.
Figure 11B:
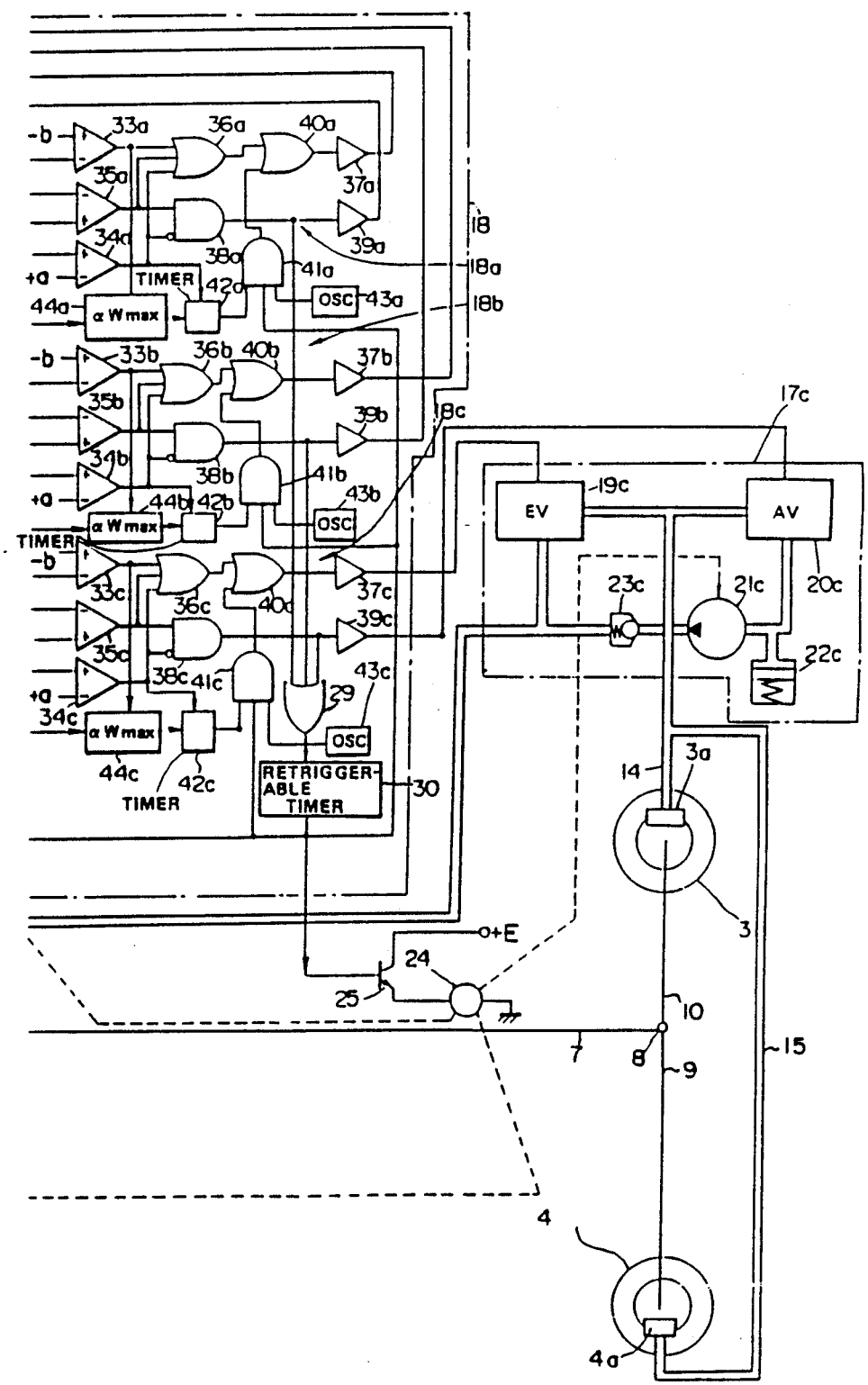

FIG. 11 shows another embodiment of an anti-skid brake control system employing the preferred embodiment of the vehicle speed representing value derivation system according to the invention. In this embodiment, the wheel slip detecting circuit 90 is modified from that in FIG. 1. In this modification, the comparators 91a, 91b and 91c of the former embodiment are replaced with comparators 95a, 95b and 95c. The comparators 95a, 95b and 95c are connected to respectively associated vehicle speed representing value derivation circuit 27a, 27b and 27c to receive respective vehicle speed representing values Vi$_1$, Vi$_2$ and Vi$_3$ at inverting input terminals. The non-inverting input terminals of the comparators 95a, 95b and 95c are connected to subtracting circuits 96a, 96b and 96c. The subtracting circuits 96a, 96b and 96c are designed to subtract a given value ΔVw which represents possible maximum allowable slippage, from the wheel Speed Vw$_1$, Vw$_2$ and Vw$_3$ from the wheel speed derivation circuits 31a, 31b and 31c. Therefore, the comparators 95a, 95b and 95c output HIGH level comparator signal while the corresponding wheel speed Vw$_1$, Vw$_2$ and V$_3$ are higher than the vehicle speed representing value exceeding the given value ΔV. The comparator signal of the comparators 95a, 95b, 95c and 95d are fed to OR gates 97a, 97b and 97c. The comparators 95a, 95b and 95c are also connected to timers 99a, 99b and 99c which is triggered by the trailing edges of the HIGH level comparator signals. The timers 99a, 99b, 99c are also connected to the OR gates 97a, 97b and 97c. These OR gates 97a, 97b and 97c are connected to an OR gate 98 which is, in turn, connected to an AND gate 100. The AND gate 100 has inverting input terminal to be connected to the retriggerable timer 30.

Figure 12:
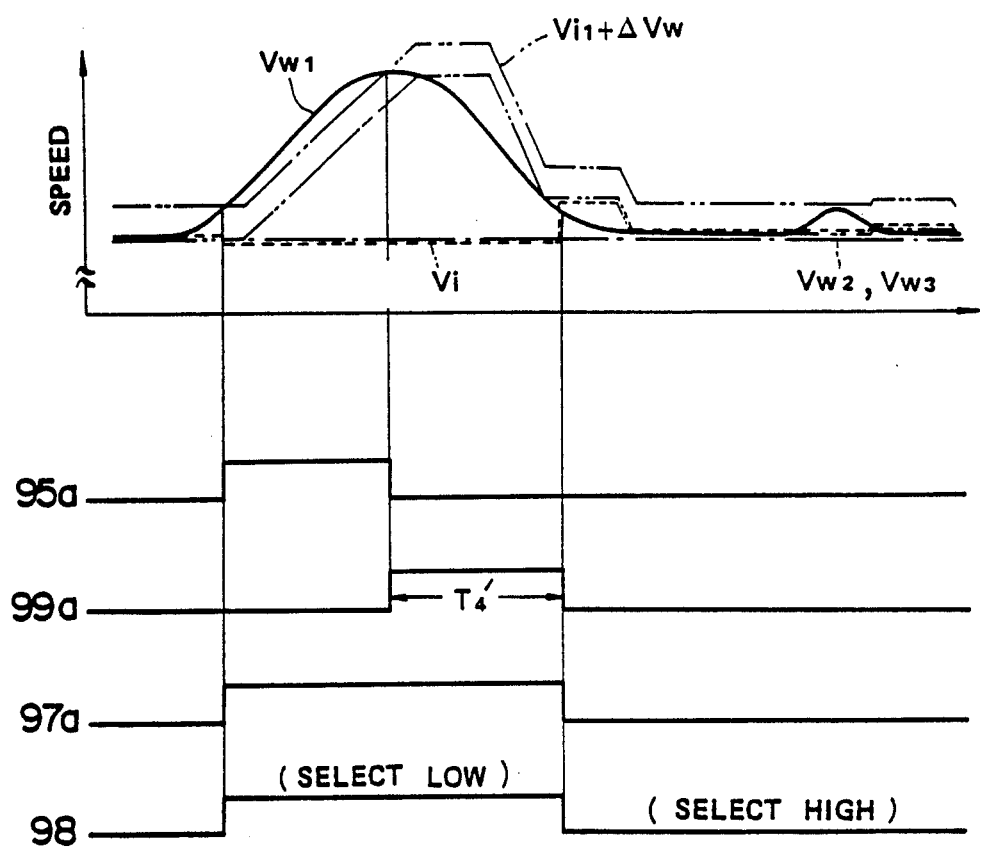
FIG. 12 is a chart showing operation of the wheel slip detecting circuit in the wheel slip control system of FIG. 11.

Therefore, even by this arrangement, wheel slippage can be detected. Similarly to the foregoing embodiment, the selector switch 58 are switched from select HIGH position to select LOW position. The operation of the wheel slip detector circuit of FIG. 11 has been illustrated in FIG. 12. The timing chart of FIG. 12 has been illustrated to show the operation of the wheel slip detector circuit 90 while the retriggerable timer 30 is not yet triggered. In this example, the HIGH level compartator is output from the comparator 95a while the sum of wheel speed $Vw_1$ and the given value $\Delta Vw$ is maintained higher than the vehicle speed representing value $Vi_1$. Since the timer 99a is triggered by the trailing edge of the HIGH level comparator signal of the comparator 95a for a given period $T_4'$ the OR gate 97a is maintained conductive for the given period $T_4'$ even after the aforementioned sum value becomes lower than the vehicle speed representing value $Vi_1$. Therefore, the selector switch 58 is held at the select LOW position while the gate signal of the OR gate 98a is maintained at HIGH level and, otherwise at the select HIGH position.

It should be appreciated that when the retriggerable timer is triggered. The AND gate 100 is maintained at non-conductive state to apply LOW level signal to the selector switch 58. Therefore, as long as the retriggerable timer is in operation, the selector switch 58 is maintained at select HIGH position.

Figure 13A:
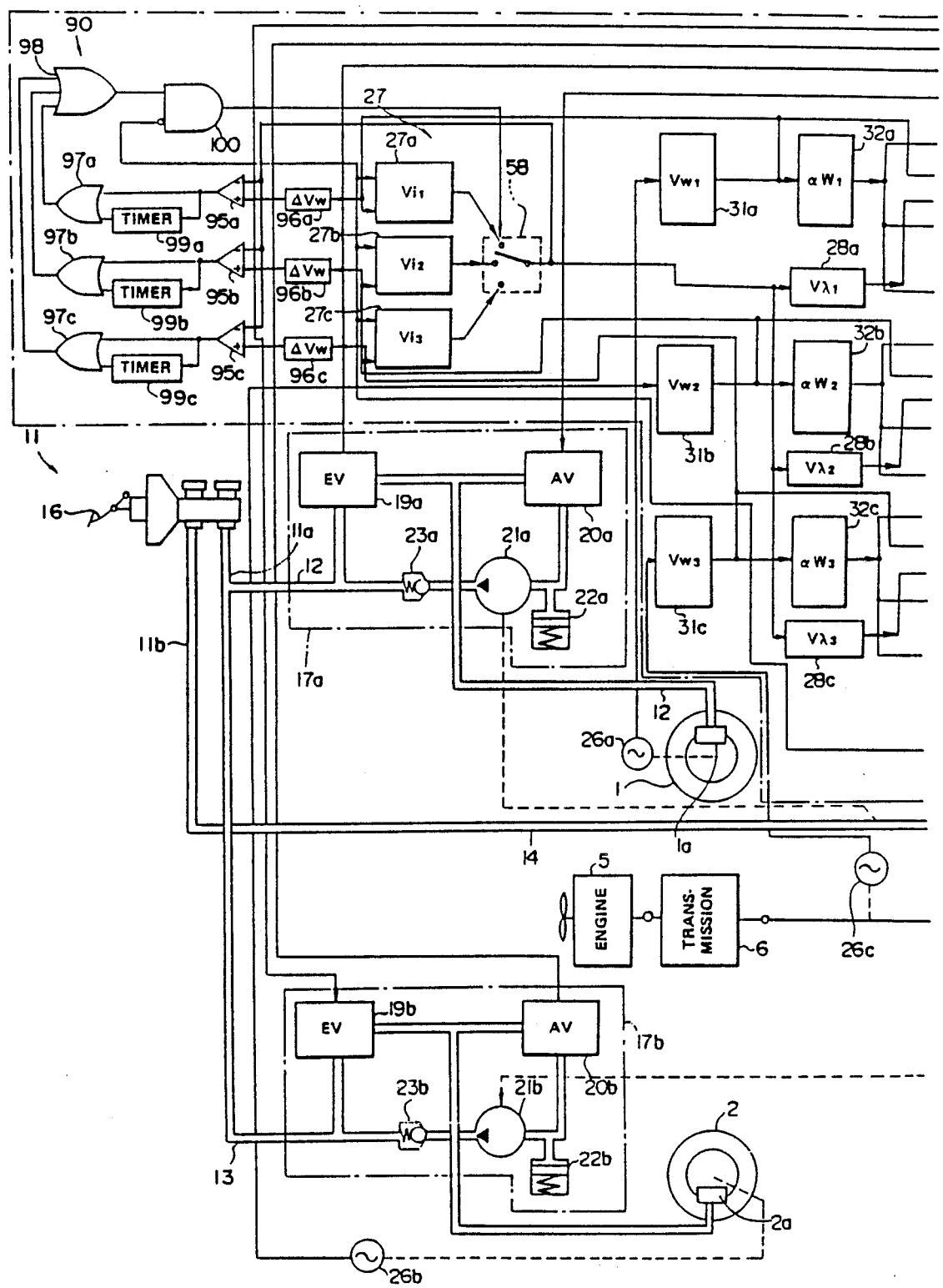
FIGS. 13(A) and 13(B) show a further example of the wheel slip control system incorporating the vehicle speed representing value derivation circuit of the invention.
Figure 13B:
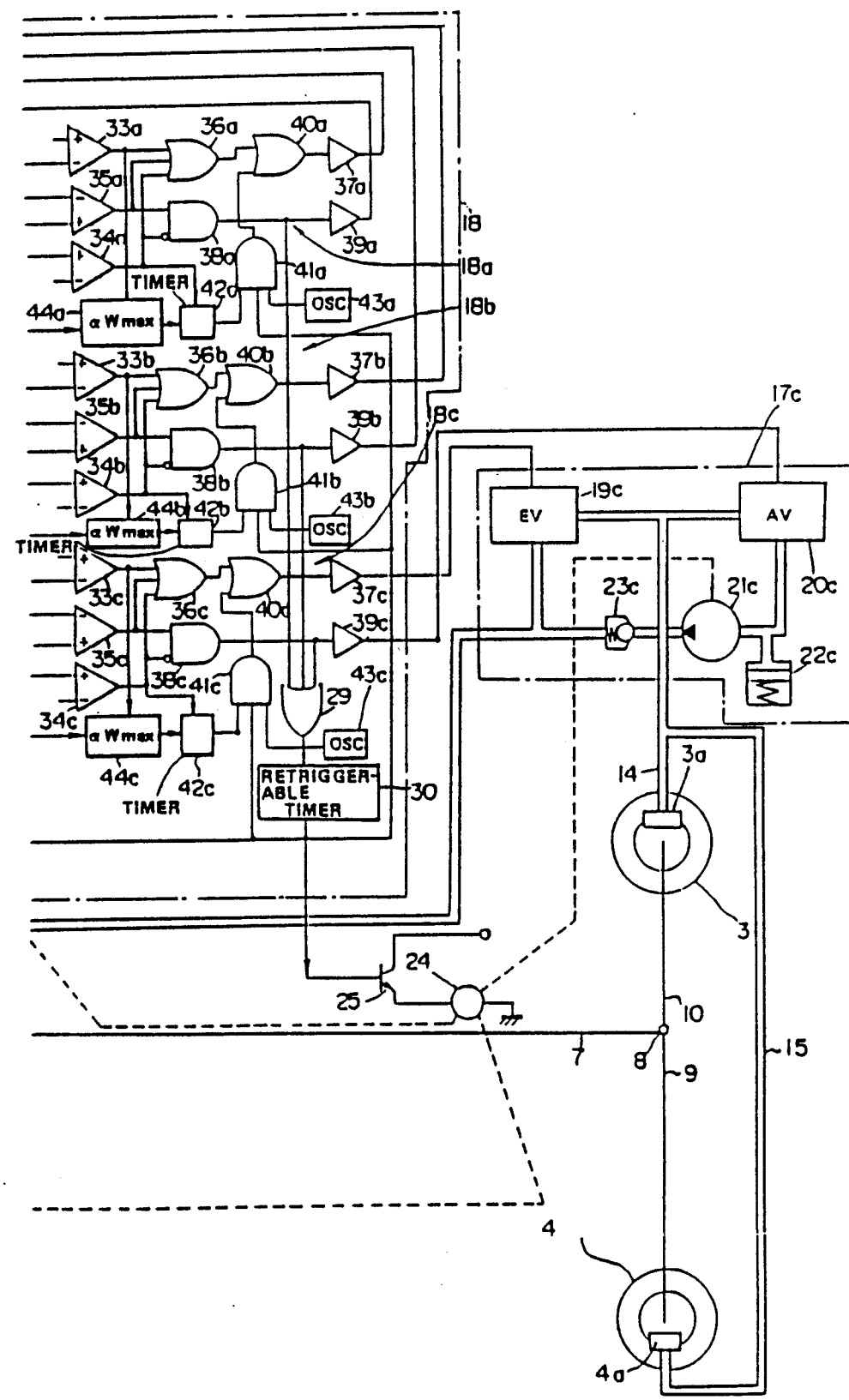
Figure 14:
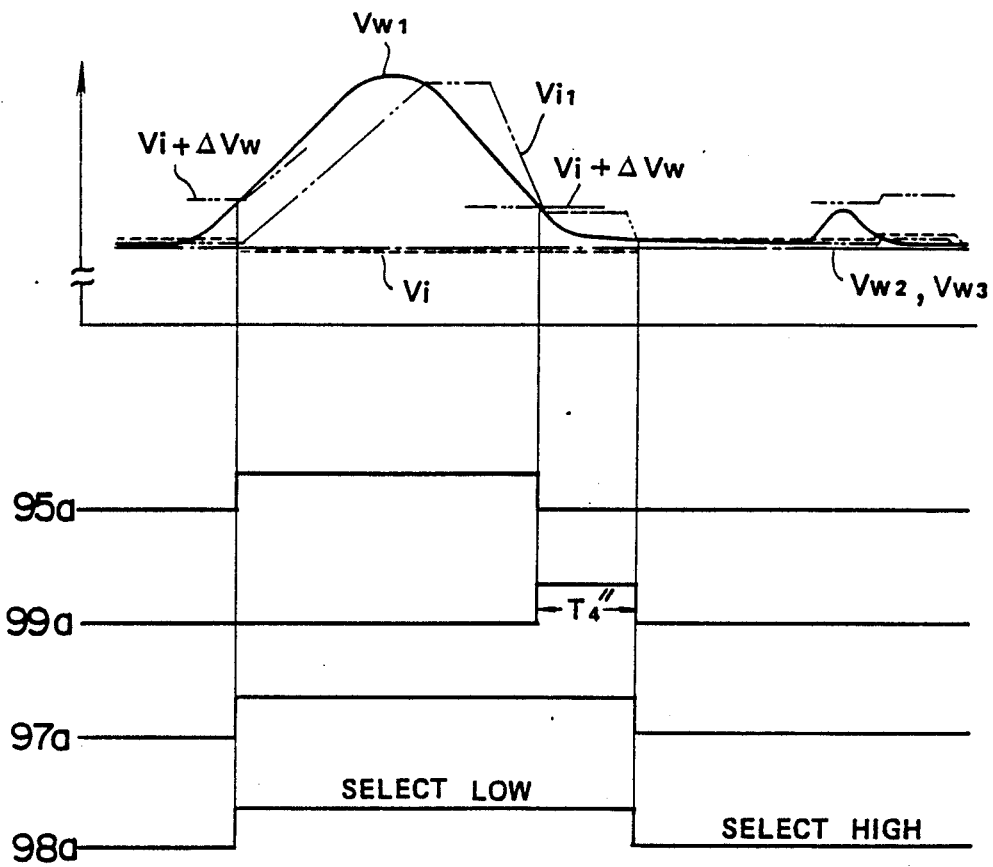
FIG. 14 is a chart showing operation of the wheel slip detecting circuit in the wheel slip control system of FIGS. 13(A) and 13(B).

FIG. 13 show a modified embodiment of the anti-skid brake control system of FIG. 11. In this embodiment, the comparators 95a, 95b and 95c are connected to the common vehicle speed represented value Vi selected by the selector switch 58. With this embodiment, equivalent wheel slip detection to that of the embodiment of FIG. 11 can be achieved. It should be appreciated from FIG. 14, by utilizing the common vehicle speed representing valve Vi, the vehicle speed representing value Vi to be compared with the sum value $(Vw_1 + \Delta Vw)$ is lowered while the selector switch 58 is acting in select LOW mode. Therefore, the ON-period of the comparator 95a can be expanded. For compensating this, the timer 99a is provided shorter given timer period $T_4$.

As will be appreciated herefrom, it is assured to derive vehicle speed representing value even when wheel acceleration slip occurs. Therefore, the invention can fulfill all of the objects sought therefor.

What is claimed is:

1. A system for projecting a value representative of a vehicle speed based on a wheel speed in a control system for controlling wheel speed of each wheel to be maintained in a predetermined relationship with the projected vehicle speed which serves as a common vehicle speed representing value, said system for projecting comprising:

first means for monitoring rotation speed of a first wheel to produce a first wheel speed indicative signal;

second means for monitoring rotation speed of a second wheel to produce a second wheel speed indicative signal;

third means for latching said first wheel speed indicative signal value when rotating condition of said first wheel satisfies a predetermined condition which is representative of a condition of said second wheel requiring slip control and for projecting a first vehicle speed representing signal based on latched first wheel speed indicative signal value;

fourth means for latching said second wheel speed indicative signal value when rotating condition of said second wheel satisfies a predetermined condition which is representative of said second wheel condition requiring slip control and for projecting a second vehicle speed representing signal based on latched second wheel speed indicative signal value;

fifth means for detecting occurrence of wheel slip at one of said first and second wheels for producing a wheel slip indicative signal; and sixth means associated with said fifth means and switchable between to a first select-high position for selecting a greater one of said first and second projected vehicle speed representing values as said common vehicle speed representing value and a second select-low position for selecting a smaller one of said first and second projected vehicle speed representing values as said common vehicle speed representing value, said sixth means normally being positioned at said first select-high position and being responsive to said wheel slip indicative signal to be switched to said second select-low position.

2. A system as set forth in claim 1, wherein said fifth means comprises means for detecting wheel acceleration at one of said first and second wheels higher than a predetermined wheel slip threshold and producing said wheel slip indicative signal whenever said wheel acceleration is higher than said wheel slip threshold.

3. A system as set forth in claim 2, wherein said fifth means further comprises means responsive to decreasing of said wheel acceleration across said wheel slip threshold, for maintaining said wheel slip indicative signal for a given period of time.

4. A system as set forth in claim 1, wherein said fifth means comprises means for comparing said first wheel speed indicative signal value with said first vehicle speed representing value to produce a first HIGH level signal when said first wheel speed indicative signal value is greater than said first vehicle speed representing value at a magnitude greater than a given value, means for comparing a second HIGH level signal value with said second vehicle speed representing value to produce said wheel slip indicative signal when said second wheel speed indicative signal value is greater than said second vehicle speed representing value at a magnitude greater than said given value and means responsive to one of said first and second HIGH level signals, for producing said wheel slip indicative signal.

5. A system as set forth in claim 4, wherein said fifth means further comprises means responsive to trailing edge of one of said first and second HIGH level signals for maintaining said wheel slip indicative signal for a given period of time.

6. A system as set forth in claim 1, wherein said fifth means comprises means for comparing said first and second wheel speed indicative signal values with said projected vehicle speed representing value to produce a wheel slip indicative signal when one of said first and second wheel speed indicative signal values is greater than said common vehicle speed representing value at a magnitude greater than a given value.

7. A system as set forth in claim 6, wherein said fifth means further comprises means responsive to trailing edge of one of said first and second HIGH level signals for maintaining said wheel slip indicative signal for a given period of time.

8. A method for projecting a value representative of a vehicle speed based on a wheel speed in a control system for controlling wheel speed of each wheel to be maintained in a predetermined relationship with the projected vehicle speed which serves as a common vehicle speed representing value, said method comprising the steps of:
   monitoring rotation speed of a first wheel to produce a first wheel speed indicative signal;
   monitoring rotation speed of a second wheel to produce a second wheel speed indicative signal;
   latching said first wheel speed indicative signal when rotation condition of said first wheel satisfies a predetermined condition which is representative of a condition of said second wheel requiring slip control and for projecting a first vehicle speed representing signal based on latched first wheel speed indicative value;
   latching said second wheel speed indicative signal when rotation condition of said second wheel satisfies a predetermined condition which is representative of a condition of said second wheel requiring slip control and for projecting a second vehicle speed representing signal based on latched second wheel speed indicative signal value;
   detecting occurrence of wheel slip at one of said first and second wheels for producing a wheel slip indicative signal; and
   switching between a first select-high position for selecting a greater one of said first and second projected vehicle speed representing values as said common vehicle speed representing value and a second select-low position for selecting a smaller one of said first and second projected vehicle speed representing values as said common vehicle speed representing value, and switching from said first select-high position to said second select-low position in response to said wheel slip indicative signal.

9. An anti-skid brake control system for an automotive brake system comprising:
   a hydraulic brake circuit including a plurality of wheel cylinders for establishing braking pressure for decelerating vehicular wheels;
   first and second anti-skid brake control valves, each associated at least one of first and second wheel cylinders associated with first and second wheels for adjusting braking pressure therein, each of said anti-skid brake control valves being operable to increase braking pressure in the associated wheel cylinder in a first mode position, and to decrease the braking pressure in the associated wheel cylinder in a second mode position;
   first sensor for monitoring rotation speed of said first wheel for producing a first wheel speed indicative signal;
   second sensor for monitoring rotation speed of said second wheel for producing a second wheel speed indicative signal;
   first arithmetic means for deriving wheel speed based on said first wheel speed indicative signal to produce a first wheel speed data;
   second arithmetic means for deriving wheel speed based on said wheel speed indicative signal to produce a second wheel speed data;
   third arithmetic means for deriving first wheel acceleration on the basis of said first wheel speed data to produce a first wheel acceleration data;
   fourth arithmetic means for deriving second wheel acceleration on the basis of said second wheel speed data to produce a second wheel acceleration data;
   fifth arithmetic means for deriving a common vehicle speed representing value which comprises:
      means for latching said first wheel speed data when said first wheel acceleration data decreases across a predetermined wheel deceleration threshold and for projecting a first vehicle speed representing signal based on a latched value;
      means for latching said second wheel speed data when said second wheel acceleration data decreases across said predetermined wheel deceleration value, and for projecting a second vehicle speed representing signal based on a latched value;
      means for detecting occurrence of wheel slip at one of said first and second wheels for producing a wheel slip indicative signal; and
      means, associated with said means for detecting and switchable between a first select-high position for selecting a greater one of said projected first and second vehicle speed representing signals as said common vehicle speed representing value and a second select-low position for selecting a smaller one of said projected first and second vehicle speed representing signals as said common vehicle speed representing value, and said means for selecting normally being positioned at said first select-high position and being responsive to said wheel slip indicative signal to be switched to said second select-low position;
   first controller for controlling said first anti-skid brake control valve between said first and second positions on the basis of said first wheel speed data and said first wheel acceleration data; and
   second controller for controlling said second anti-skid brake control valve between said first and second positions on the basis of said second wheel speed data and said second wheel acceleration data.

* * * * *